United States Patent [19]
Hashimoto et al.

[11] Patent Number: 5,931,905
[45] Date of Patent: Aug. 3, 1999

[54] TV MAIL SYSTEM

[75] Inventors: Koichi Hashimoto; Isamu Miura; Yasuko Katayama, all of Tokyo, Japan

[73] Assignee: Kabushiki Kaisha Toshiba, Kawasaki, Japan

[21] Appl. No.: 08/808,856

[22] Filed: Feb. 28, 1997

[30] Foreign Application Priority Data

Feb. 29, 1996 [JP] Japan .................................. 8-043464

[51] Int. Cl.⁶ .................................................. G06F 13/10
[52] U.S. Cl. ............................ 709/217; 349/12; 349/13; 345/327
[58] Field of Search .......................... 395/200.47–200.49; 345/327; 348/6, 7, 10, 12, 13; 455/3, 3.2, 37, 4.1, 42, 51, 6.1, 6.2, 6.3

[56] References Cited

U.S. PATENT DOCUMENTS 5,461,667 10/1995 Remillard .
5,479,491 12/1995 Herrero Garcia et al. ............. 348/7 X
5,557,320 9/1996 Krebs ....................................... 348/12

FOREIGN PATENT DOCUMENTS 0 396 186 11/1990 European Pat. Off. .
7-254076 9/1995 Japan .

*Primary Examiner*—Nathan Flynn
*Attorney, Agent, or Firm*—Oblon, Spivak, McClelland, Maier & Neustadt, P.C.

[57] ABSTRACT

TV mail system comprising a plurality of televisions each having a receiving function capable of receiving broadcasting radio waves and displaying a program, and a mail server to which the televisions are connected through communication lines, wherein the television has a mail sending function for making mail including at least destination information and the body of a mail to output the mail data to the mail server and a mail receiving function for displaying the contents of mail data received from the mail server together with the received mail, the mail server has a database in which authentication information of users are registered, a receiving mail box for storing received mail data, mail boxes for receivers, a mail distribution device for distributing, to a mail box for the receiver, mail data stored in the receiving mail box by making a reference to the authentication database and an outputting device which sends out the mail data received from one television to at least one different television in corresponding with the destination information.

48 Claims, 43 Drawing Sheets

| USER ID | NAME | ADDRESS | TELEPHONE NUMBER | INCOMING FLAG |
|---|---|---|---|---|
| 1111 | KATAYAMA ×× | TACHIKAWA-CITY AKEBONO-CHO | 0425-22-××ΔΔ | OFF |
| 1234 | MIURA ΔΔ | HAMURA-CITY HANE | 0423-33-ΔO×× | ON |
| | | | | |

AUTHENTICATION DATA BASE

F I G. 2

| SENDER ID | DESTINATION | BODY |
|---|---|---|
| 1234 | 0425-22-×××× | HELLO |
| | | |
| | | |

DATA STRUCTURE OF RECEIVING BOX

F I G. 3

USER ID =1111

| SENDER ID | BODY |
|---|---|
| HAMURA-CITY MIURA | HELLO |
| | |
| | |

DATA STRUCTURE OF MAIL BOX

F I G. 4

FLOWCHART OF INTERACTIVE TV

FLOWCHART OF LOCAL RESPONSE SERVER

| HEADER | RECEIVER |
|---|---|
| MAIL RECEIVING REQUEST | 1111 |

(MAIL RECEIVING REQUEST DATA)

FIG. 11

| HEADER | DESTINATION | SENDER | BODY |
|---|---|---|---|
| MAIL RECEIVING | 1111 | HAMURA-CITY MIURA | HELLO |

(MAIL RECEIVING DATA)

FIG. 12

| USER ID | NAME | ADDRESS | TELEPHONE NUMBER | INCOMING FLAG | RECEIVING AUTORIZED SENDER LIST |
|---|---|---|---|---|---|
| 1111 | KATAYAMA○○ | TACHIKAWA-CITY AKEBONO-CHO | 0425-22-XX△△ | OFF | ID =··· <br> ID =··· |
| 1234 | MIURA XX | HAMURA-CITY HANE | 0423-33-△0XX | ON | |
| | | | | | |

FIG. 13

| HEADER | SENDER | |
|---|---|---|
| SEND AUTHORIZED SENDER LIST | 1234 | LIST |

FIG. 14

| USER ID | NAME | ADDRESS | TELEPHONE NUMBER | INCOMING FLAG | RECEIVING REJECTED SENDER LIST |
|---|---|---|---|---|---|
| 1111 | KATAYAMA○○ | TACHIKAWA-CITY AKEBONO-CHO | 0425-22-××△△ | OFF | ID =··· <br> ID =··· |
| 1234 | MIURA ×× | HAMURA-CITY HANE | 0423-33-△0×× | ON | |
| | | | | | |

FIG. 15

| HEADER | SENDER | |
|---|---|---|
| REGISTRATION REQUEST OF REJECTED SENDER LIST | 1111 | MAIL NUMBER OF RECEIVING REJECTED SENDER |

FIG. 16

| USER ID | NAME | ADDRESS | TELEPHONE NUMBER | INCOMING FLAG | LOCAL RESPONSE SERVER |
|---|---|---|---|---|---|
| 1111 | KATAYAMA ×× | TACHIKAWA-CITY AKEBONO-CHO | 0425-2200×× | OFF | LOCAL RS2 |
| 1234 | MIURA △△ | HAMURA-CITY HANE | 0423-33△00× | ON | LOCAL RS1 |
| | | | | | |

AUTHENTICATION DATA BASE

F I G. 1 8

| LOCAL RESPONSE SERVER | NETWORK ADDRESS |
|---|---|
| LOCAL RS1 | 888-8888 |
| LOCAL RS2 | 999-9999 |
| | |

DATA STRUCTURE OF
NODE MANAGING INFORMATION

F I G. 1 9

| DESTINATION | SENDER | BODY |
|---|---|---|
| 1111 | HAMURA-CITY MIURA | HELLO |
| | | |
| | | |

DATA STRUCTURE OF ROUTING BOX

F I G. 2 0

FLOWCHART OF LOCAL RESPONSE SERVER
(MAIL TRANSFER PROGRAM)

FLOWCHART OF LOCAL RESPONSE SERVER
(MAIL ROUTING PROGRAM)

NAME ANALYSIS SERVER PROGRAM

MAIL DISTRIBUTION PROGRAM

| HEADER | SENDER | DESTINATION |
|---|---|---|
| NAME ANALYSIS REQUEST | 1234 | 0425-22-XX△△ |

NAME ANALYSIS REQUEST DATA

| HEADER | SENDER | DESTINATION | ROUTING ADDRESS | NETWORK ADDRESS |
|---|---|---|---|---|
| NAME ANALYSIS RESULT | HAMURA-CITY MIURA | 1111 | LOCAL RS2 | 999-9999 |

NAME ANALYSIS RESULT DATA

F I G. 27

| HEADER | RECEIVER | DESTINATION | SENDER | BODY |
|---|---|---|---|---|
| MAIL INTERCHANGE | LOCAL RS2 | 1111 | HAMURA-CITY MIURA | HELLO |

MAIL INTERCHANGE DATA

F I G. 28

| HEADER | DESTINATION |
|---|---|
| TURNING OFF REQUEST OF INCOMING FLAG | 1111 |

TURNING OFF REQUEST DATA OF INCOMING FLAG

F I G. 29

| USER ID | NAME | ADDRESS | TELEPHONE NUMBER | LOCAL RESPONSE SERVER |
|---|---|---|---|---|
| 1111 | KATAYAMA○○ | TACHIKAWA-CITY AKEBONO-CHO | 0425-22-xxxx | LOCAL RS2 |
| 1234 | MIURA xx | HAMURA-CITY HANE | 0423-33-xxxx | LOCAL RS1 |
| | | | | |

AUTHENTICATION DATA BASE

FIG. 31

USER ID = 1111

| INCOMING FLAG | ON | |
|---|---|---|
| SENDER | DESTINATION | BODY |
| 1233 | 0425-22-xxxx | HELLO |
| | | |
| | | |

MAIL BOX OF RECEIVER

FIG. 32

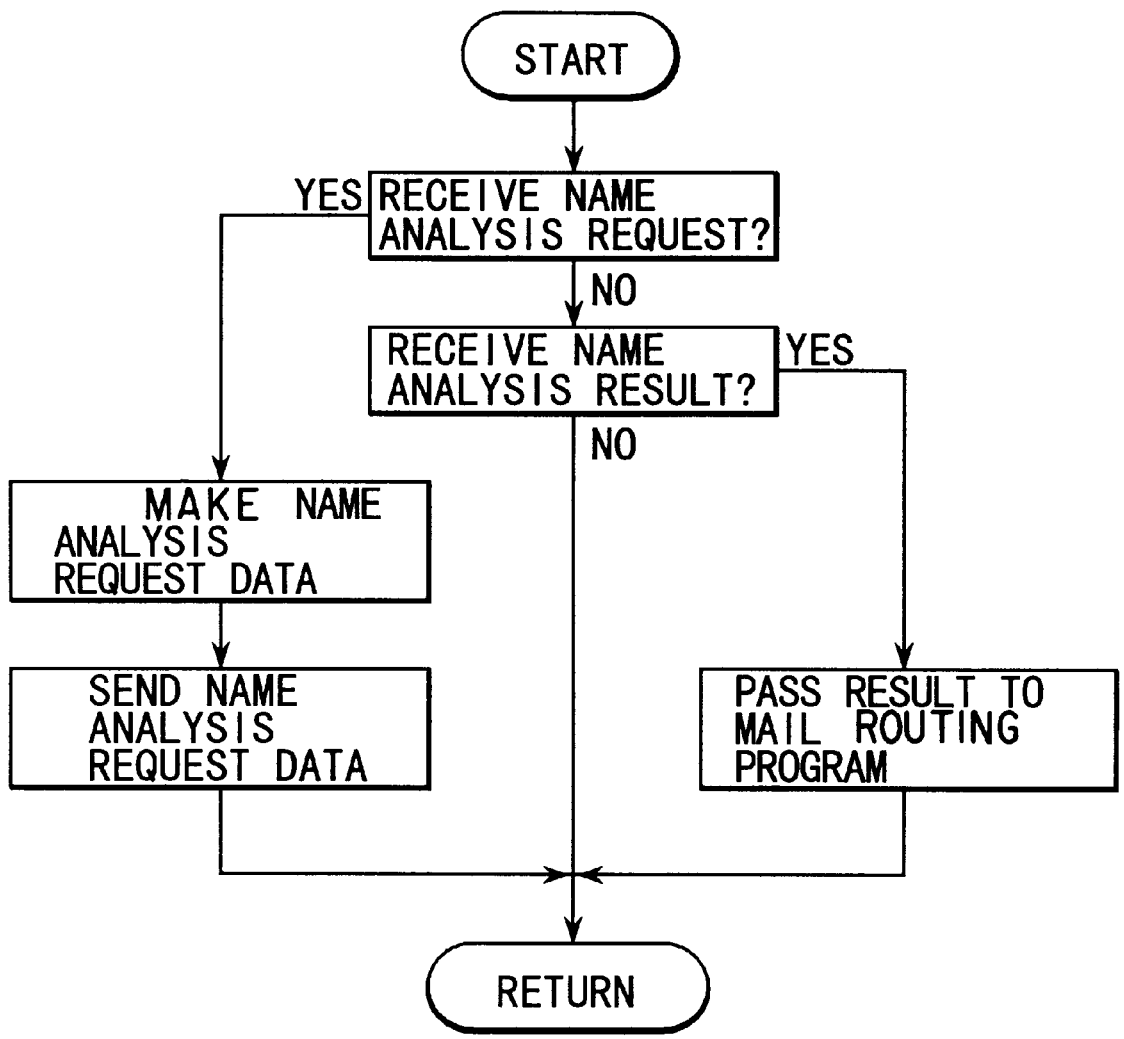
F I G. 34

MAIL DISTRIBUTION PROGRAM

| SCREEN TYPE | SCREEN DATA |
|---|---|
| SERVICE SCREEN | A546F876.... |
| SENDING SCREEN | ......... |
| RECEIVING SCREEN | ......... |
DATA STRUCTURE OF SCREEN DATABASE
F I G. 3 7
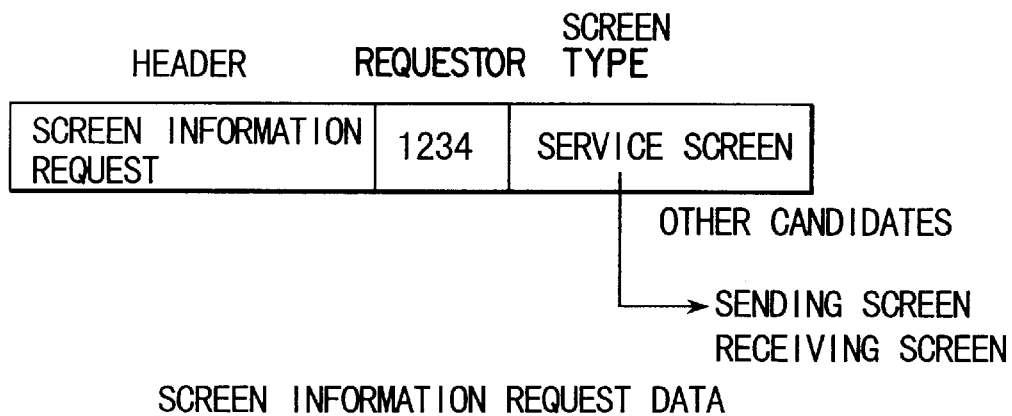
SCREEN INFORMATION REQUEST DATA
F I G. 3 8
| HEADER | REQUESTOR | SCREEN DATA |
|---|---|---|
| SCREEN | 1234 | A546F876..... |
SCREEN INFORMATION DATA
F I G. 3 9

TYPICAL BODY CLASSIFICATION SCREEN

TYPICAL BODY LIST

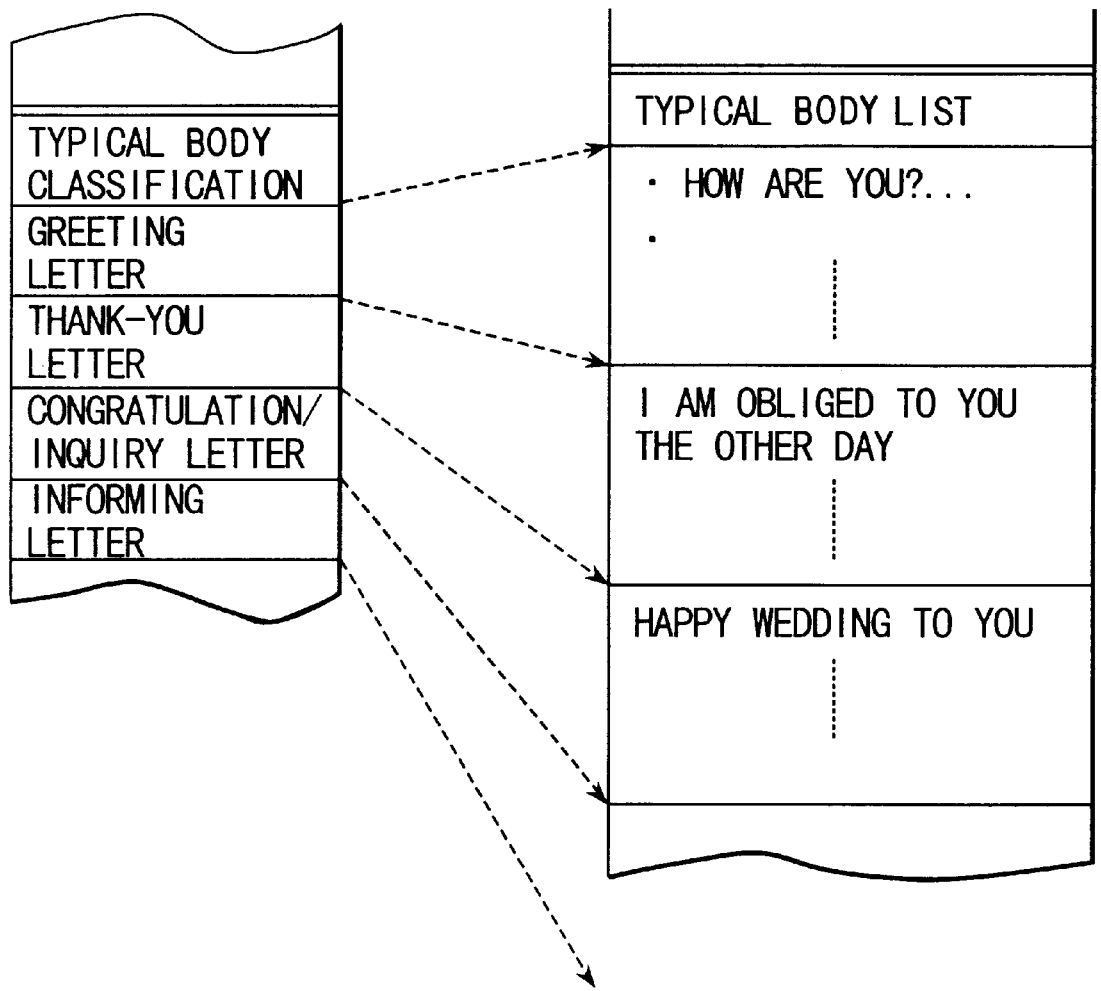
F I G. 4 2

| HEADER | SENDER | DESTINATION | BODY | PRINT PERMISSION FLAG |
|---|---|---|---|---|
| MAIL SENDING | 1234 | 0425-22-XXXX | HELLO | PRINT DISAPPROVE |

MAIL SENDING DATA

| HEADER | DESTINATION | SENDER | BODY | PRINT PERMISSION FLAG |
|---|---|---|---|---|
| MAIL RECEIVING | 1111 | HAMURA-CITY MIURA | HELLO | PRINT DISAPPROVE |

MAIL RECEIVING DATA

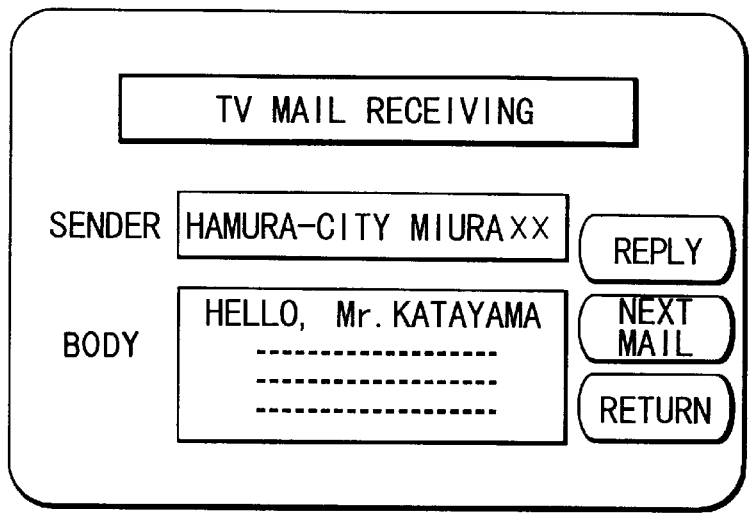
FIG. 46A
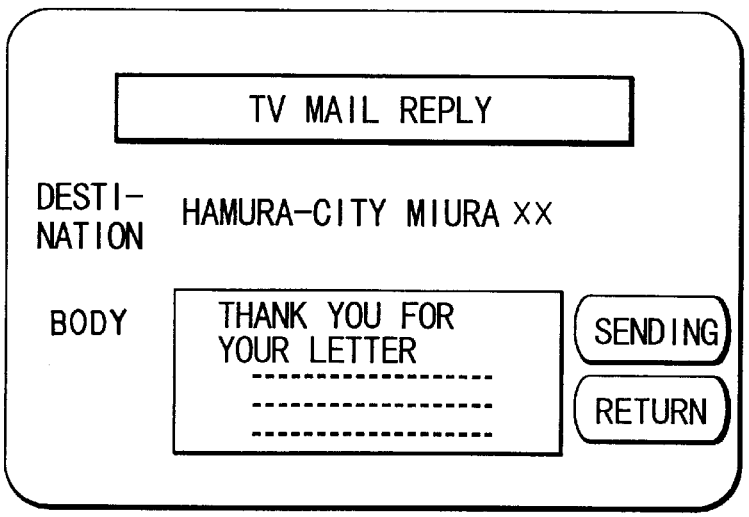
FIG. 46B
| HEADER | DESTINATION | SENDER ID | SENDER | BODY |
|---|---|---|---|---|
| MAIL RECEIVING | 1111 | 0423-33-XXXX | HAMURA-CITY MIURA | HELLO |
MAIL RECEIVING DATA
FIG. 47

| HEADER | SENDER | DESTINATION | BODY | SORT |
|---|---|---|---|---|
| MAIL SENDING | 1111 | 0423-33-xxxx | THANK YOU FOR YOUR LETTER... | REPLY |

MAIL SENDING DATA

FIG. 48

USER ID = 1111

| SENDER ID | SENDER | BODY | SORT |
|---|---|---|---|
| 0423-33-xxxx | HAMURA-CITY MIURA | HELLO | ORIGINAL |
| | | | |
| | | | |

FIG. 49

USER ID = 1234

| SENDER ID | SENDER | BODY | SORT |
|---|---|---|---|
| 0425-22-xxxx | TACHIKAWA-CITY KATAYAMA | THANK YOU FOR YOUR LETTER | REPLY |
| | | | |
| | | | |

FIG. 50

FLOWCHART OF INTERACTIVE TV

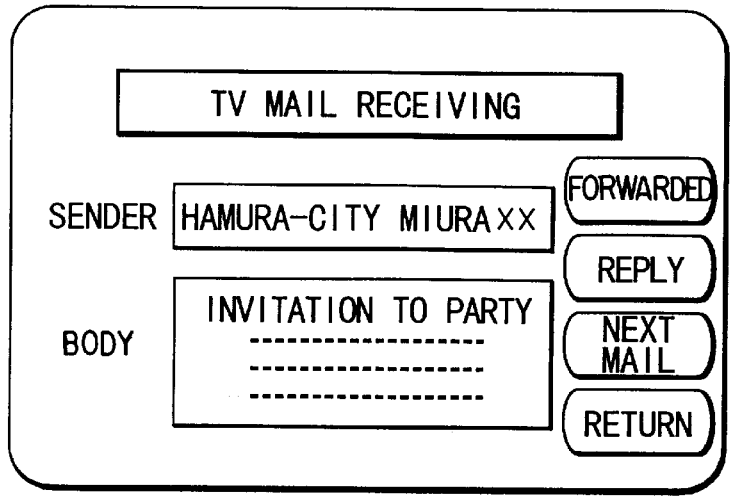
F I G. 5 2
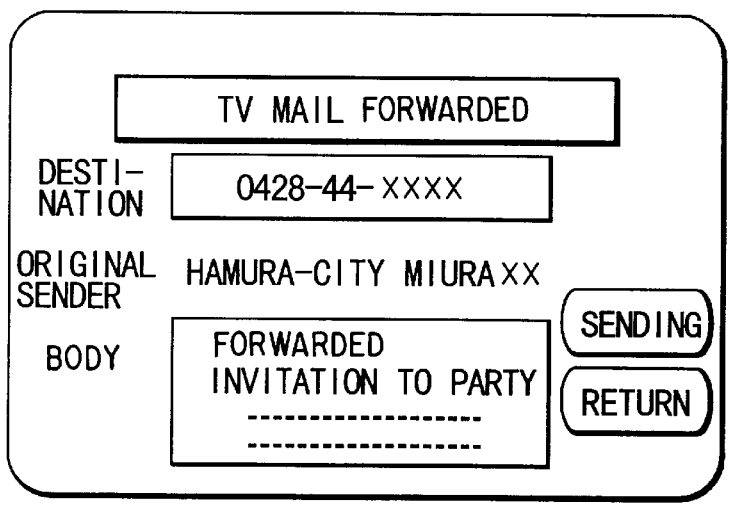
F I G. 5 3
| HEADER | SENDER | DESTINATION | BODY | SORT | ORIGINAL SENDER |
|---|---|---|---|---|---|
| MAIL SENDING | 1111 | 0428-44-xxxx | FORWARDED INVITATION TO.. | FORWARD | HAMURA-CITY MIURA |
F I G. 5 4    MAIL SENDING DATA
USER ID = 1234
| SENDER ID | SENDER | BODY | SORT | ORIGINAL SENDER |
|---|---|---|---|---|
| 0425-22-xxxx | TACHIKAWA-CITY KATAYAMA | FORWARDED INVITATION TO.. | FORWARD | HAMURA-CITY MIURA |
F I G. 5 5    DATA STRUCTURE OF MAIL BOX

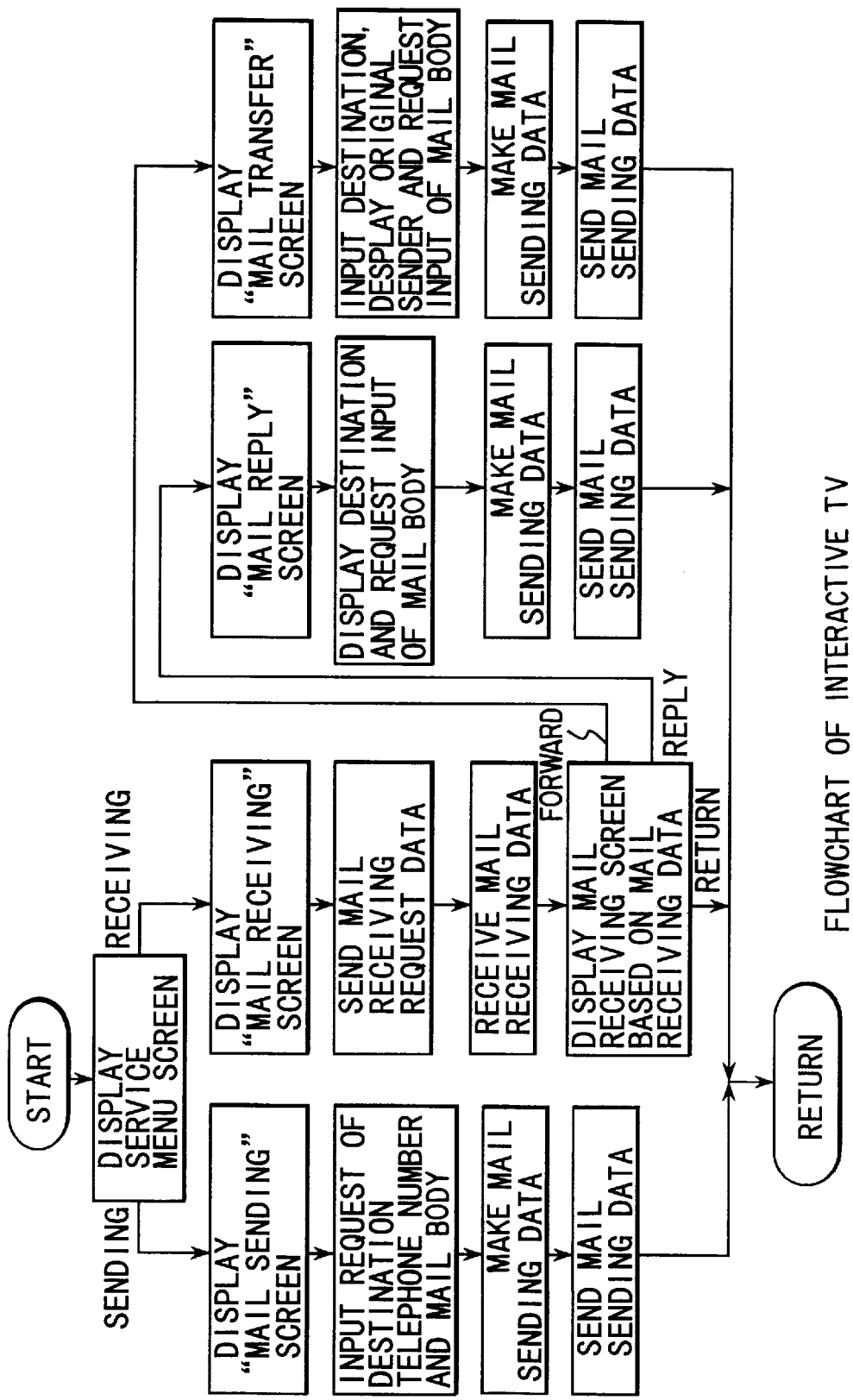
FIG. 56   FLOWCHART OF INTERACTIVE TV

USER ID = 1234

| DESTINATION | BODY |
|---|---|
| 0425-22-xxxx | HELLO |
|  |  |
|  |  |

DATA STRUCTURE OF SENDING HISTORY BOX

FIG. 58

| SENDER | DESTINATION | BODY |
|---|---|---|
| 1234 | 0425-22-xxxx | HELLO |
|  |  |  |
|  |  |  |

DATA STRUCTURE OF RECEIVING BOX

FIG. 59

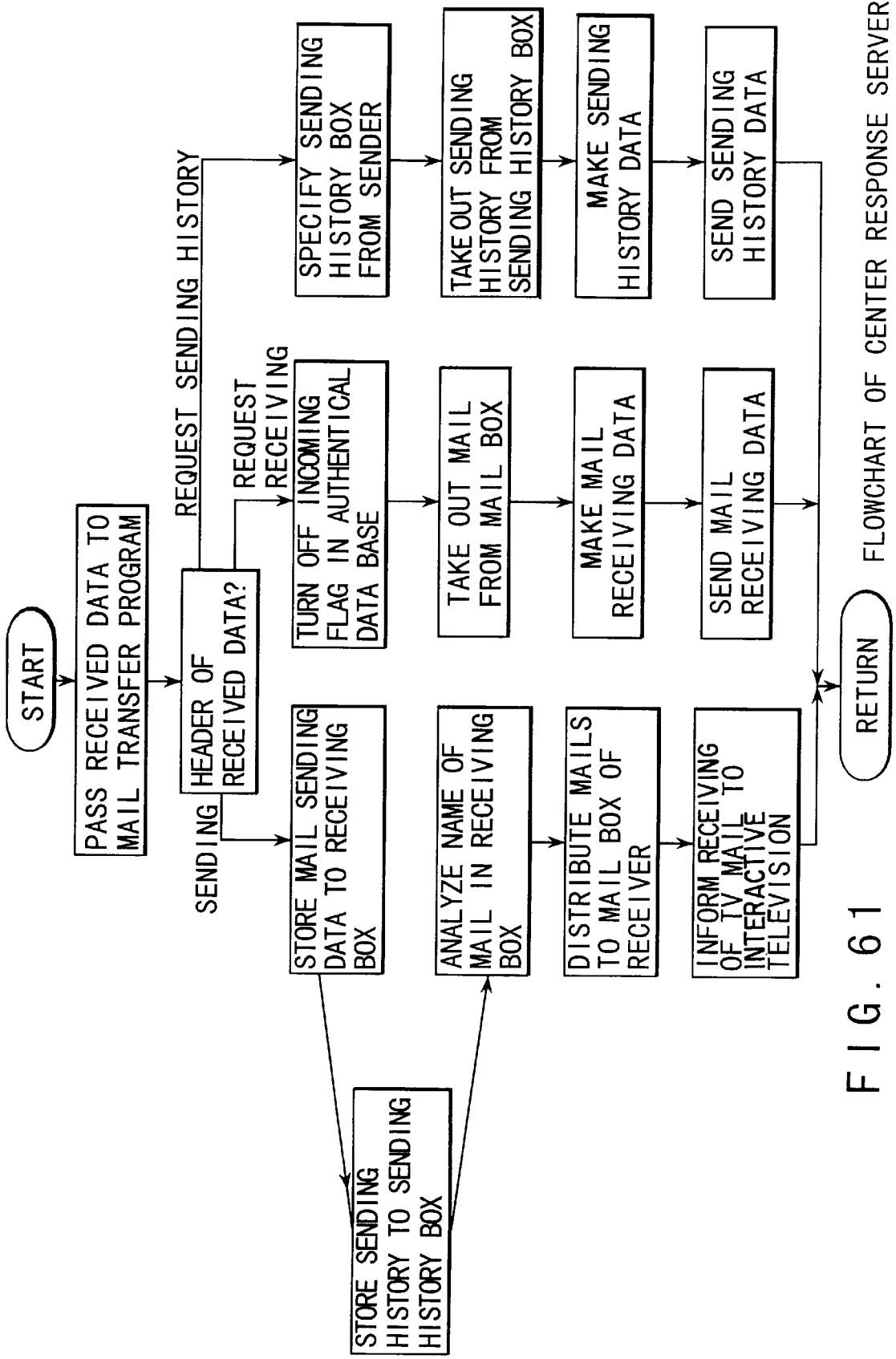
FIG. 61 FLOWCHART OF CENTER RESPONSE SERVER

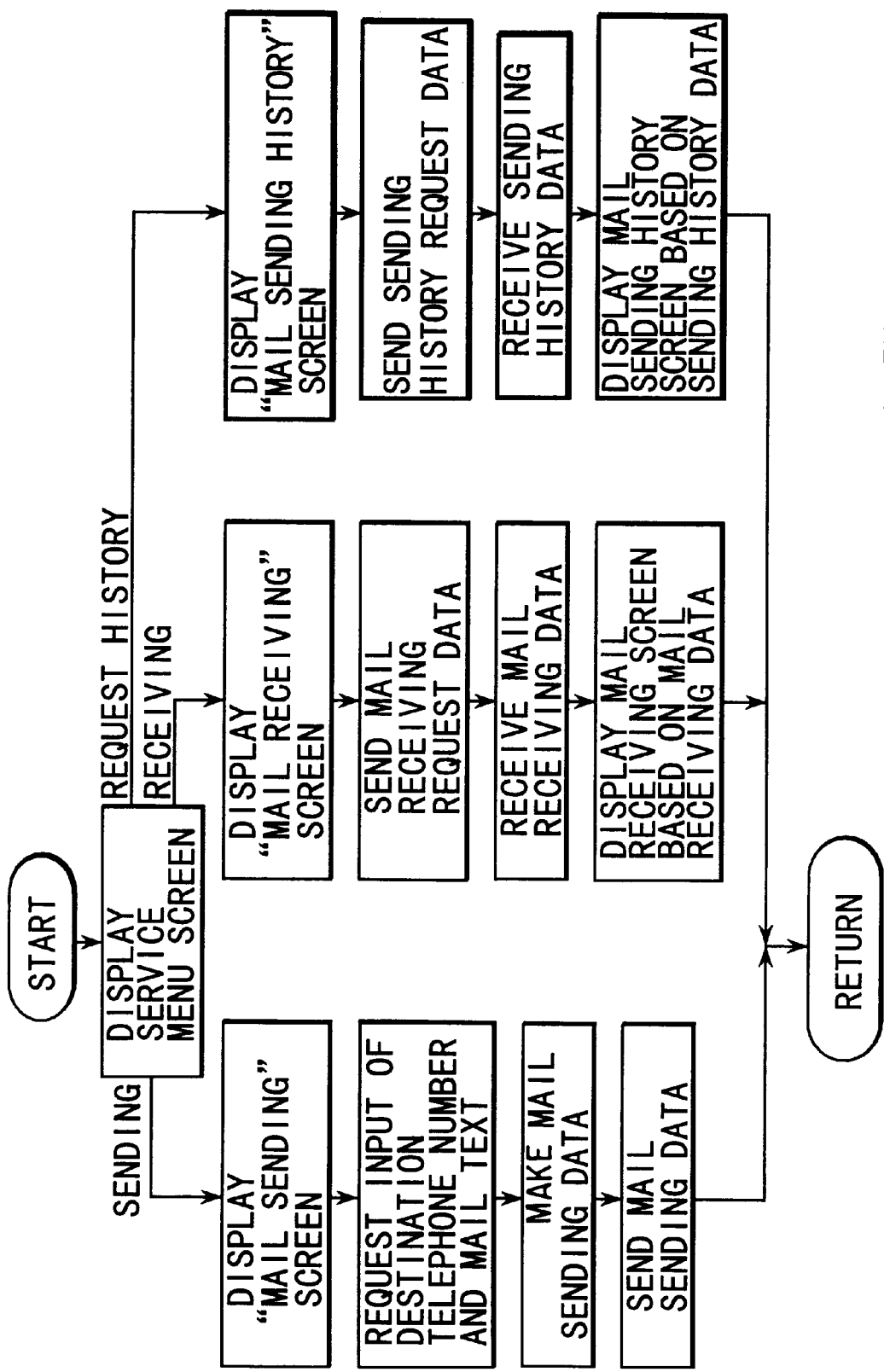
FIG. 62 FLOWCHART OF INTERACTIVE TV

FIG. 63

SENDING HISTORY REQUEST DATA

| HEADER | SENDER |
|---|---|
| SENDING HISTORY REQUEST | 1234 |

FIG. 64

SENDING HISTORY DATA

| HEADER | DESTINATION | BODY |
|---|---|---|
| SENDING HISTORY | 0425-22-xxxx | HELLO |

FIG. 65  DATA STRUCTURE OF SENDING HISTORY BOX

USER ID = 1234

| MESSAGE ID | DESTINATION | BODY | RECEIVING STATUS |
|---|---|---|---|
| 1234567890 | 0425-22-xxxx | HELLO | NO |
|  |  |  |  |
|  |  |  |  |

FIG. 66  DATA STRUCTURE OF RECEIVING MAIL BOX

USER ID = 1111

| MESSAGE ID | SENDER | DESTINATION | BODY |
|---|---|---|---|
| 1234567890 | 1234 | 0425-22-xxxx | HELLO |
|  |  |  |  |
|  |  |  |  |

FIG. 67  DATA STRUCTURE OF MAIL BOX

USER ID = 1111

| MESSAGE ID | SENDER ID | SENDER | BODY |
|---|---|---|---|
| 1234567890 | 1234 | HAMURA-CITY MIURA | HELLO |
|  |  |  |  |
|  |  |  |  |

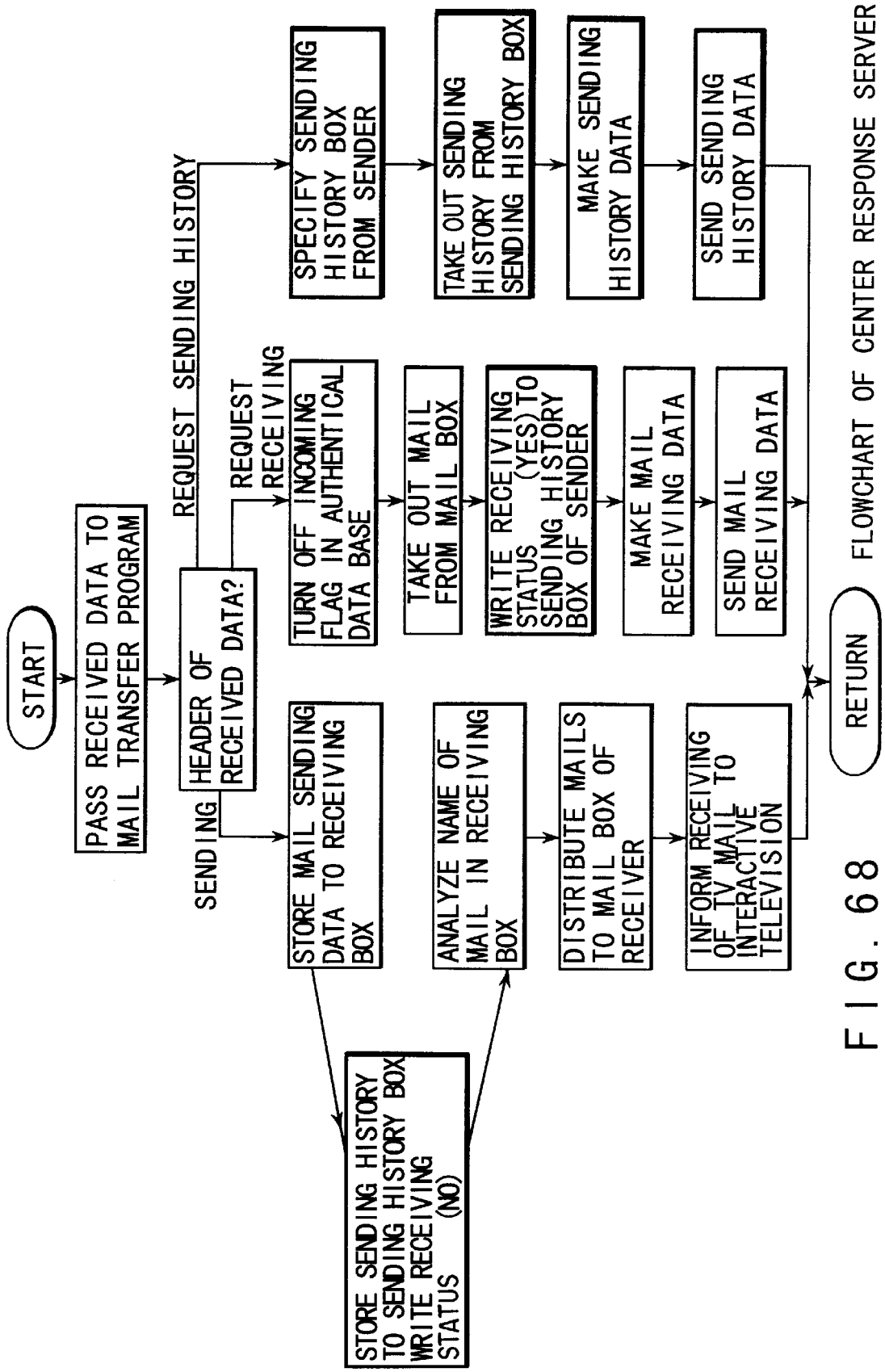
FIG. 68 FLOWCHART OF CENTER RESPONSE SERVER

| HEADER | DESTINATION | BODY | RECEIVING STATUS |
|---|---|---|---|
| SENDING HISTORY | 0425-22-XXXX | HELLO | NO |
SENDING HISTORY DATA
FIG. 69
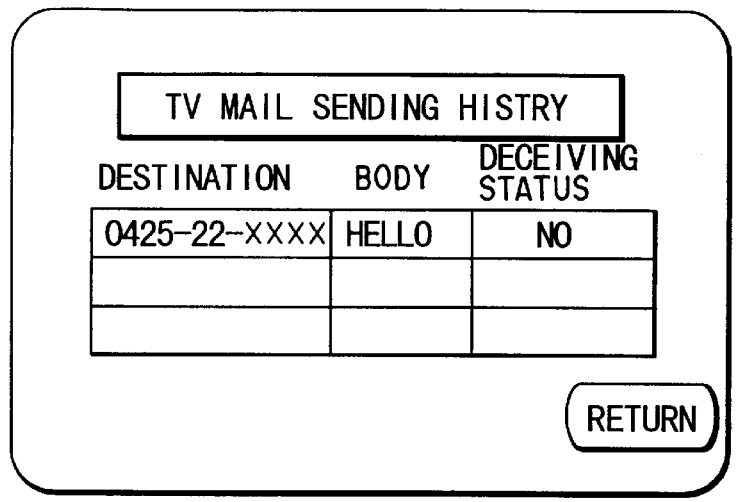
FIG. 70
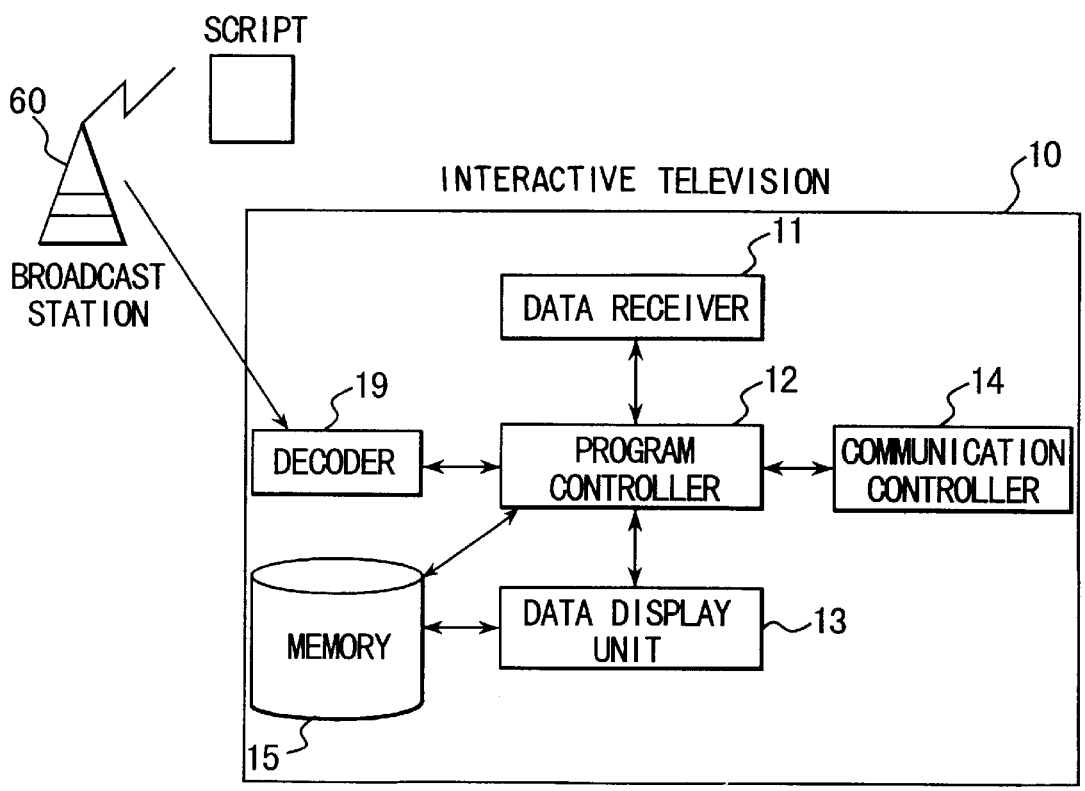
FIG. 71

FLOWCHART OF BROADCAST STATION

FLOWCHART OF INTERACTIVE TV

FLOWCHART OF INTERACTIVE TV

FLOWCHART OF INTERACTIVE TV

TV MAIL SYSTEM

BACKGROUND OF THE INVENTION

The present invention relates to a interactive television system formed by televisions each having a program broadcast receiving function and response servers to which the receivers are connected through communication lines, and more particular to a TV mail system for sending and receiving electronic mails to and from the televisions.

Recently, the advancement of the performance of television for home use results in techniques for using the television being attracted attention as a part of multimedia field. At present, teletext broad casting has been put into practical use, the teletext being a technology in which a multiplicity of programs multiplied on broadcasting waves are, by the receiver side, selectively received in accordance with the needs for the receiver side and converted into television video signals so as to be displayed on the television screen.

By using the technique of the teletext, a multiplicity of teletext programs and programs in the form of static or dynamic images can arbitrarily be presented to viewers in addition to usual television broadcast. For example, a commodity, the commercial film of which is being broadcast, and a method of purchasing the same can be broadcast by a teletext program multiplied on the television program above.

However, since the conventional television broadcast system one-way presents information from the broadcast station to viewers through televisions, selective display of supplementary information of a commodity required by a user among a plurality of commodities presented in a program, or calling viewers during the program to real-time add up responses from the viewers to reflect the response to the contents of the program cannot be performed.

In order to realize a bi-directional program (hereinafter called a "bi-directional program") with which not only one-way presenting information from the presenter of a program to viewers can be performed but also viewers are permitted to return responses to the program, it might be feasible to employ a interactive television (hereinafter called a "interactive television") having a function capable of accepting response data through the television from which a television program is being broadcast to send data above to an accumulation center (a response server).

However, the television adapted to the teletext broadcasting is arranged to perform only one-way information transmission such that programs transmitted from a broadcast station are presented for viewers. As described above, use of the television of the foregoing type has been limited.

As described above, since the television for home use is arranged to perform only one-directional information communication such that programs are presented to viewers, use of the television of this type has been limited.

BRIEF SUMMARY OF THE INVENTION

An object of the present invention is to provide a TV mail system which is capable of widening use of home-use television to a field for sending and receiving electronic mails without a necessity of using a calculating machine, such as a personal computer.

In order to achieve the foregoing object, the present invention has the following means.

According to one aspect of the present invention, there is provided a TV mail system comprising: a plurality of televisions each having a receiving function capable of receiving broadcasting radio waves and displaying a program; and a mail server to which the televisions are connected through communication lines, is characterized in that the television has a mail sending function for making mail including at least destination information and the body of a mail to output the mail data to the mail server and a mail receiving function for displaying the contents of mail data sent from the mail server, the mail server has a database in which authentication information of users are registered, a receiving mail box for storing received mail data, mail boxes for receivers, a mail distribution means for distributing, to a mail box for the receiver, mail data stored in the authentication database and an outputting means which sends out the mail data received from one television to at least one different television in corresponding with the destination information.

According to the present invention, the mail sending function of the television is arranged to make mail data from the destination and the mail body so as to be transmitted to the mail server. In the mail server, supplied mail data is stored in the receiving mail box thereof. Mail data stored in the receiving mail box is, by the distribution means, distributed to the mail box of the receiver by making a reference to the authentication database.

In the mail server, the forward means makes mail data from mail information distributed to the mail box to transmit mail data above to the television for the receiving-side person. The television displays the received mail on the basis of the contents of the mail data received from the mail server by the mail receiving function.

Specifically, the TV mail system may have a structure such that the television has a mail sending function for displaying a mail sending screen and accepting destination telephone number and a mail body to make mail data so as to output the mail data to the mail server, and a mail receiving function for receiving mail data transmitted from the mail server to meet a mail receiving request to display a mail receipt screen on the basis of the contents of mail data, and the mail server has a database in which authentication information including user identifier of users of the televisions are registered, a receiving mail box for storing received mail data, mail boxes for receivers, name analysis means which retrieves the authentication database in accordance with destination telephone number of mail data stored in the receiving mail box to acquire information for specifying the mail box of a destined receiver, mail distribution means for storing mail data stored in the receiving mail box in the mail box in accordance with information for specifying the mail box, and transfer means which takes out mail information from the corresponding mail box to meet a mail receiving request from the television to make mail data so as to output the mail data to the televisions of the receiver who has made the mail receiving request.

In the above-mentioned structure, the authentication database has a region in which receiving information is written and receiving information is brought to an receiving state when mail data has been received and is brought to a non-receiving state when the mail receiving request has been made.

As a result of employment of the foregoing structure, the authentication database is able to manage the receiving state of electronic mails to all of users. Moreover, receipt can be urged for a user if an income electronic mail has not been received for a long time.

According to a second aspect of the present invention, there is provided a TV mail system comprising: a plurality of televisions each having a receiving function capable of receiving broadcasting radio waves and displaying a program; a plurality of local mail servers to which the televisions are connected through communication lines in each predetermined area and which are connected to one another on a network; and a center mail server to which the local servers are connected through the communication lines, is characterized in that the television has a mail sending function which makes mail including at least destination information and the body of a mail to output the mail data to the local mail server, and a mail receiving function for displaying a received mail on the basis of the contents of mail data received from the local server, the center mail server has a database in which authentication information of users are registered and name analysis means which acquires, from the authentication database, authentication information of a receiver, analysis of which has been requested by the local servers, to output the authentication information to the local server from which the request has been made, and the local mail server has a receiving mail box for storing received mail data, mail boxes for receivers, interchange means which makes mail routing data formed by adding authentication information with respect to analysis request responded from the center mail server so as to interchange mail routing data to the receiving-side local mail servers, distribution means for storing mail routing data interchanged from the sending-side local mail servers to a mail box for the receiver in accordance with authentication information, and transfer means which makes mail data from mail information distributed to the mail box so as to output the mail data to the televisions for the receiver.

As a result, the TV mail function can be dispersed to the center mail server and the local mail servers. Thus, the load which must be borne by the center mail server can be reduced.

Node management information is provided for the center mail server for managing addresses of the local mail servers on the network which are connected to one another through the network; and the address is notified when analysis is requested so that interchange data is easily forwarded from the sending-side local mail server to the receiving-side local mail server.

The preferred aspects of the TV mail system according to the present invention are as follows:

(1) The mail box for the receiver has a region in which receiving information is written, receiving information is brought to an receiving state when mail routing data has been received from the sending-side local mail servers and is brought to a non-receiving state when the mail receiving request has been made.

Since the process for turning off the receiving flag is closed in the local mail server, amount of communication with the center mail server can be reduced.

(2) The television has replay mail making means which accepts a reply mail to the received mail when a received mail is displayed and which makes mail data for a reply mail in which telephone number of the sender provided for the received mail is automatically set as destined telephone number when a request to make the reply mail has been made.

Since the address of the reply mail can automatically be set, the load of the input operation for a user can be reduced.

(3) The television has forward mail making means which accepts a forward request of a received mail when the received mail is displayed and which makes mail data for transference in which the address of the sender provided for the received mail is automatically set as the address of an original sender when a request to forward the received mail has been made.

Since the address of the original sender can automatically be set to the forward mail, the load of the input operation for a user to write the forward mail can be reduced.

(4) Any one of the mail server, the center mail server or the local mail servers has a sending history box prepared for each user, means for storing mail data in the receiving mail box when the server has received mail data and storing mail data in a sending history box for the user and means which takes out the sending history from the sending history box for the user when a sending history request has been received to make sending history data so as to output the sending history data to the television from which the request has been made, and the television has means which accepts sending history request on the mail service screen to output the sending history request data to the server provided with the sending history box and means for displaying a list of sending history of the user on the basis of sending history data transmitted from the server to correspond to the sending history request.

Since sending history can be displayed, a new mail can be written by using a mail written and sent previously.

(5) The television has classification selection means for causing a classification list of typical bodies to cause a user to select a classification of the typical bodies from the classification list, typical body selection means for causing a list of the typical bodies belonging to the classification of the typical bodies selected by the classification selection means to cause the user to select a typical body and input support means for supporting writing of a mail by inserting one or a plurality of the typical bodies selected by the typical body selection means into a mail body which is being written.

Typical bodies can be input by selecting buttons from the television with which characters cannot easily be input. Therefore, the load of the input operation for user can be reduced.

(6) The television has printing means for reading contents of screen data which is being displayed on the screen and printing screen data and means for requesting the printing means to print the contents by recognizing a print command issued from a user.

The contents of screen data which is being displayed on the screen can be printed. In the structure above, the television has means for adding, to mail data, a print permission flag indicating whether or not the mail can be printed and means for checking the print permission flag added to mail data received by the television to determine whether or not printing is permitted.

Mails of a type which is considered that printing is undesirable can be protected by the sender.

(7) Any one of the mail server, the center mail server or the local mail servers has a screen database for storing screen data relating to a mail service which is displayed by the television so that required screen data taken out from the screen database is forwarded to the television which has made a request.

In a case of version-up of the contents of the mail service, the program for all of the televisions cannot be changed. However, the present invention enables a changed mail service can be provided for all of the users only by rewriting the screen database of the server.

(8) The television has means for extracting, from received broadcasting radio waves transmitted from a broadcast station, a script in which procedures for mail transmission and receipt, a variety of required screen data items corresponding to the contents of the mail service and control consents of screen display are described and a memory for storing the script extracted by the extracting means.

Only by transmitting broadcasting radio waves having a latest script from a broadcast station, the script of all of the televisions can be updated. In the foregoing structure, the television has means for accepting a script update request supplied from a user and script update means for storing a corresponding script in the memory to update the script when the script has been extracted from the received broadcasting radio waves in a state where the script update request supplied to the acceptance means is effective. Only when the user requests the script to be updated, the script can be updated.

By giving version number to the script which is provided for the broadcasting radio waves by the broadcast station, whether or not the script received by the television is a latest one can be determined.

By using the interactive television as the televisions, a response server according to embodiments below can be used as the mail server, the center mail server or the local mail server.

As described above, according to the present invention, there is provided a TV mail system which is capable of widening use of home-use television to a field for sending and receiving electronic mails without a necessity of using a calculating machine, such as a personal computer.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a diagram showing the data structure in an authentication database according to the first embodiment;

FIG. 3 is a diagram showing the data structure in a receiving mail box according to the first embodiment;

FIG. 4 is a diagram showing the data structure of a mail box according to the first embodiment;

FIG. 11 is a diagram showing the data format for mail receiving request data;

FIG. 12 is a diagram showing the data format for mail data;

FIG. 13 is a diagram showing the data structure in an authentication database according to a second embodiment of the present invention;

FIG. 14 is a diagram showing the data format for sending data of an authorized sender list according to the second embodiment;

FIG. 15 is a diagram showing the data structure in another authentication database according to the second embodiment;

FIG. 16 is a diagram showing the data format of another sending data item of the authorized sender list according to the second embodiment;

FIG. 18 is a diagram showing the data structure in an authentication database according to the third embodiment;

FIG. 19 is a diagram showing the data structure of node managing information according to the third embodiment;

FIG. 20 is a diagram showing the data structure in an routing box according to the third embodiment;

FIG. 27 is a diagram showing the data format for name analysis result data;

FIG. 28 is a diagram showing the data format for mail routing data;

FIG. 29 is a diagram showing the data format for receiving flag turning off request data;

FIG. 31 is a diagram showing the data structure in an authentication database according to the fourth embodiment;

FIG. 32 is a diagram showing the data structure in a mail box according to the fourth embodiment;

FIG. 34 is a flow chart for a name analysis client program according to the fourth embodiment;

FIG. 37 is a diagram showing the data structure in a screen database according to the fifth embodiment;

FIG. 38 is a diagram showing the data format for screen information request data according to the fifth embodiment;

FIG. 39 is a diagram showing the data format for screen information data according to the fifth embodiment;

FIG. 42 is a diagram showing the structure of a storage region according to the sixth embodiment;

FIGS. 46A and 46B are diagrams showing the structure of a screen for receiving/sending a mail which is displayed in the structure according to an eighth embodiment of the present invention;

FIG. 47 is a diagram showing the data format for mail data according to the eighth embodiment;

FIG. 48 is a diagram showing the data format for mail data according to the eighth embodiment;

FIG. 49 is a diagram showing the data structure in a mail box storing a received mail to which a replay mail will be sent in the structure according to the eighth embodiment;

FIG. 50 is a diagram showing the data structure in the mail box storing a reply mail according to the eighth embodiment;

FIG. 52 is a diagram showing the structure of a screen displayed for receiving a mail in a structure according to a ninth embodiment of the present invention;

FIG. 53 is a diagram showing the structure of a screen displayed for forwarding a mail in the structure according to the ninth embodiment;

FIG. 54 is a diagram showing the data format for mail forward data according to the ninth embodiment;

FIG. 55 is a diagram showing the data structure in a mail box according to the ninth embodiment;

FIG. 56 is a flow chart of an operation in a interactive television according to the ninth embodiment;

FIG. 58 is a diagram showing the data structure in a sending history box according to the tenth embodiment;

FIG. 59 is a diagram showing the data structure in receiving mail box according to the tenth embodiment;

FIG. 61 is a flow chart of an operation in a center response server according to the tenth embodiment;

FIG. 62 is a flow chart of an operation in a interactive television according to the tenth embodiment;

FIG. 63 is a diagram showing the data format for sending history request data according to the tenth embodiment;

FIG. 64 is a diagram showing the data format for sending history data according to the tenth embodiment;

FIG. 65 is a diagram showing the data structure in a sending history box according to an eleventh embodiment of the present invention;

FIG. 66 is a diagram showing the data structure in a receiving mail box according to the eleventh embodiment;

FIG. 67 is a diagram showing the data structure in a mail box according to the eleventh embodiment;

FIG. 68 is a flow chart of an operation in a center response server according to the eleventh embodiment;

FIG. 69 is a diagram showing the data format for sending history data according to the eleventh embodiment;

FIG. 70 is a diagram showing the structure of a sending history screen which is displayed in the structure according to the eleventh embodiment;

FIG. 71 is a diagram showing the relationship between a interactive television and a broadcast station according to the twelfth embodiment of the present invention;

DETAILED DESCRIPTION OF THE INVENTION

Embodiments of the present invention will now be described.

(First Embodiment)

Figure 1:
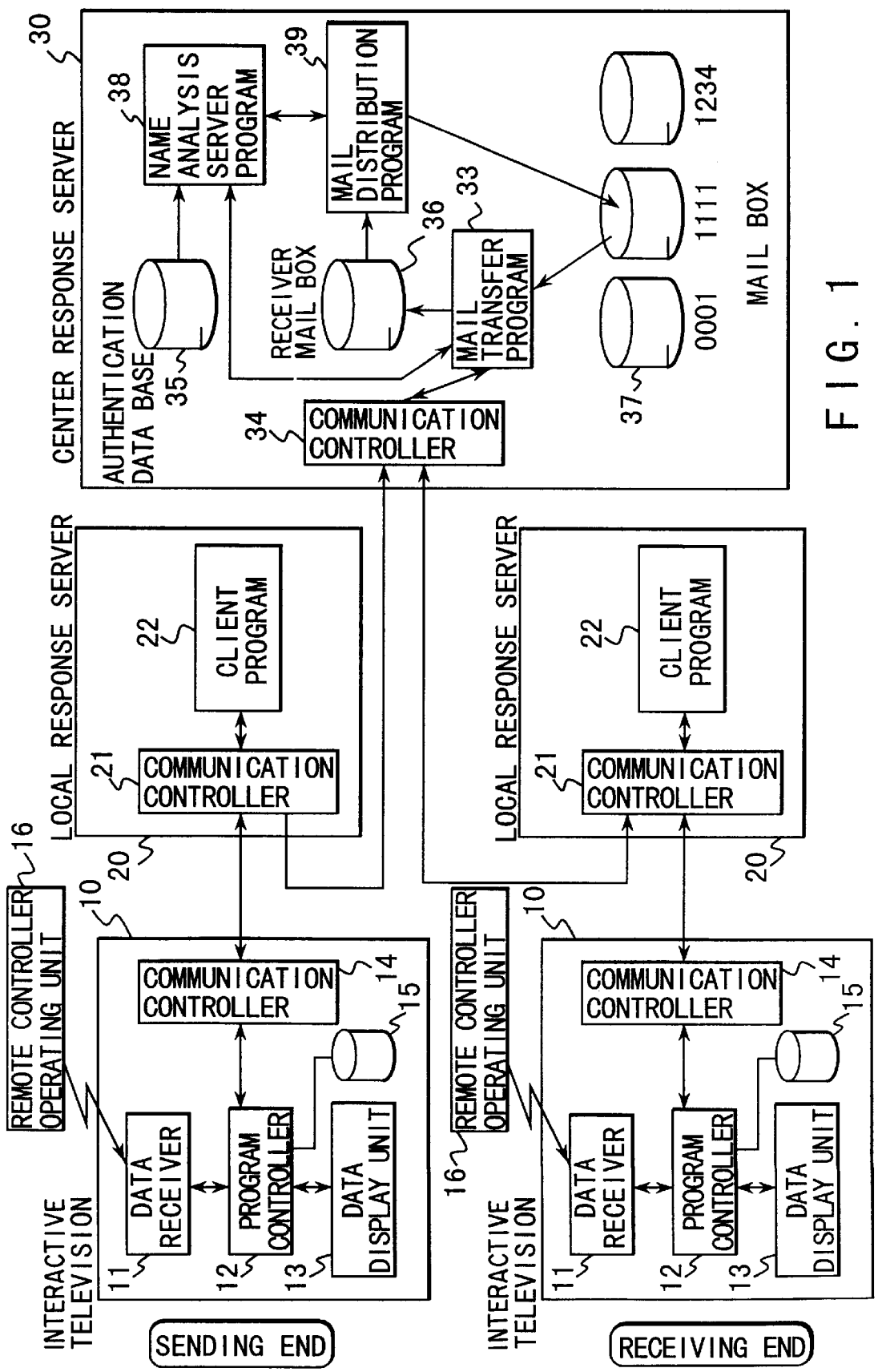
FIG. 1 is a diagram showing the structure of a TV mail system according to a first embodiment of the present invention.

FIG. 1 is a schematic view showing a TV mail system according to a first embodiment of the present invention.

The TV mail system is formed by a plurality of authenticated and registered interactive televisions 10 installed in usual homes, local response servers 20 scattered locally to communicate with the interactive televisions 10 in the area and a center response server 30 connected to all of the local response servers 20 such that mutual communication is permitted.

The interactive television 10 receives broadcast radio waves transmitted from a broadcast station by a data receiver 11 thereof. The interactive television 10 separates broadcast radio waves into information of the original broadcast program and information of the interactive television program (programs, images, characters) from each other to supply the interactive television programs and the like to a program controller 12, and forward information of the original broadcast program to a data display unit 13. The program controller 12 executes the interactive television program and accepts a response to the interactive television program returned from a user through a remote controller operating unit 16. Moreover, the program controller 12 provides an electronic mail service to meet a request from a user. Fixed information required for the interactive television 10 to provide the TV mail service has been stored in information storing section (a memory) 15.

The interactive televisions 10 and the local response server 20 are connected through lines by corresponding communication controllers 14 and 21. Although a telephone line is used in this embodiment, another communication line may be employed. Also the local response servers 20 and the center response server 30 are connected to each other through their communication controllers 21 and 34.

The local response server 20 has a client program 22 having a function for interpreting the contents of a header provided for sending/receiving data, a request data and the like. The client program 22 forward mail data sent from the interactive television 10 to the center response server 30 and interchanges mail data sent from the center response server 30 to meet a mail receiving request.

The center response server 30 has an authentication database 35 storing authenticated information of previously registered users, a receiver mail box 36 for storing mail data sent from the local response servers 20 and a mail boxes 37 for respective users. The mail box 37 is managed with identification numbers (ID=0001, ID=1111, ID=1234, . . . ,).

FIG. 2 is a diagram showing the structure of data in the authentication database 35.

The authentication database 35 manages all of users, which have been registered, with user IDs respectively given to the authenticated information including names, addresses, telephone numbers and the like, TV mail receiving information and other information items.

FIG. 3 is a diagram showing the structure of data in the receiver mail box 36.

Data in the receiver mail box 36 is sectioned into a sender, destination and the body for each TV mail. Note that the destination is the telephone number.

FIG. 4 is a diagram showing the structure of data in the mail box 37.

The mail box 37 is prepared for a user to which a TV mail has been sent, the mail box 37 being managed with the user ID. Data for the mail box 37 is composed of a sender and the body.

The center response server 30 has a mail transfer program 33 for forwarding a TV mail stored in the mail box 37 to meet a request from the local response server 20, a mail distribution program 39 for storing TV mails stored in the receiver mail box 36 into corresponding mail boxes 37 in accordance with results of analysis of the destinations and a name analysis server program 38 for analyzing the destinations of the TV mails stored in the receiver mail box 36.

The operation of the system having the above-mentioned structure will now be described with reference to FIGS. 5 to 12.

Figure 5:
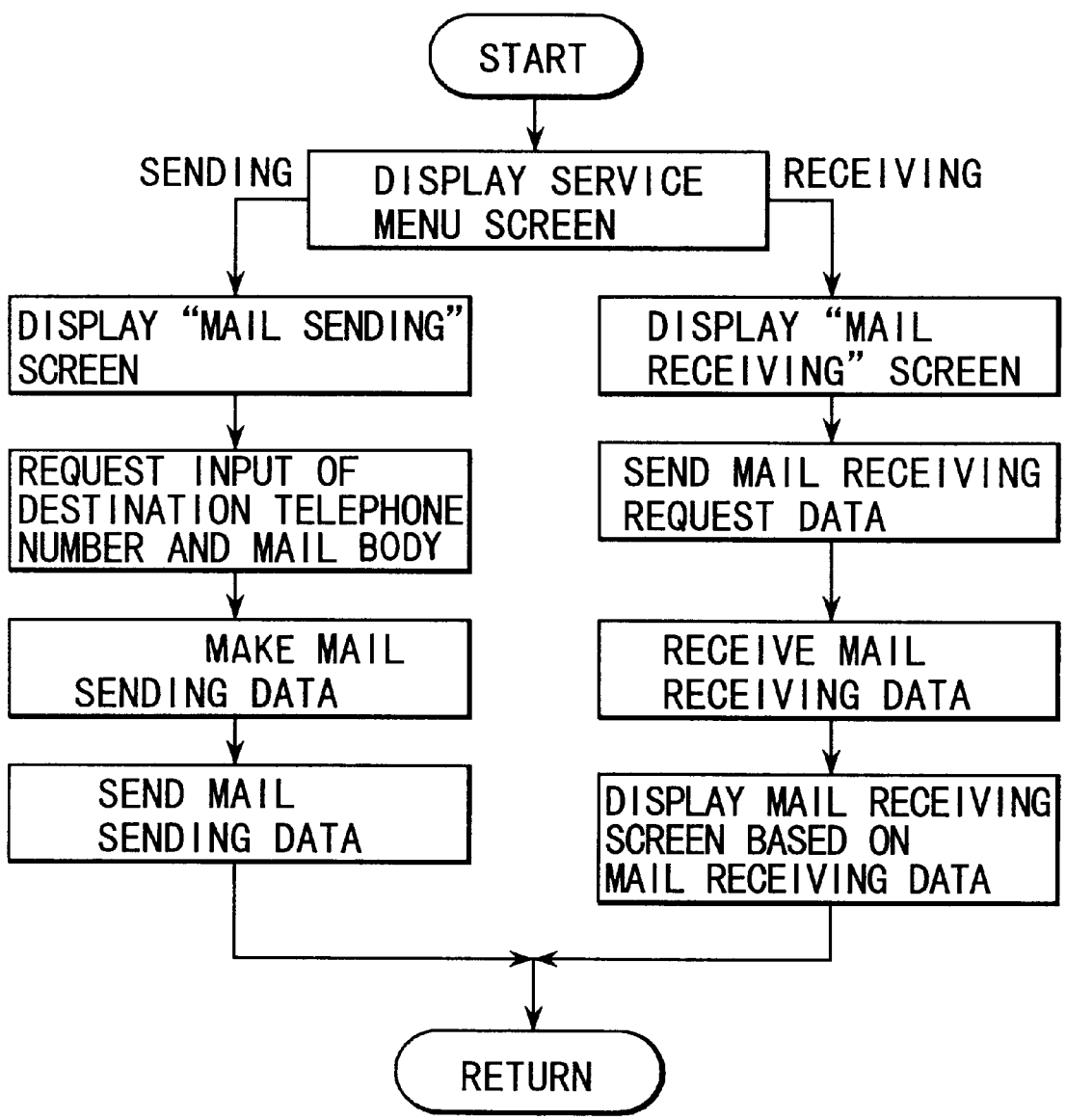
FIG. 5 is a flow chart of an operation in a interactive television according to the first embodiment.

FIG. 5 is a flow chart of operations of the interactive television 10 which are performed when a TV mail is sent and received. Initially, the operation for sending a TV mail will now be described.

Figure 6A:
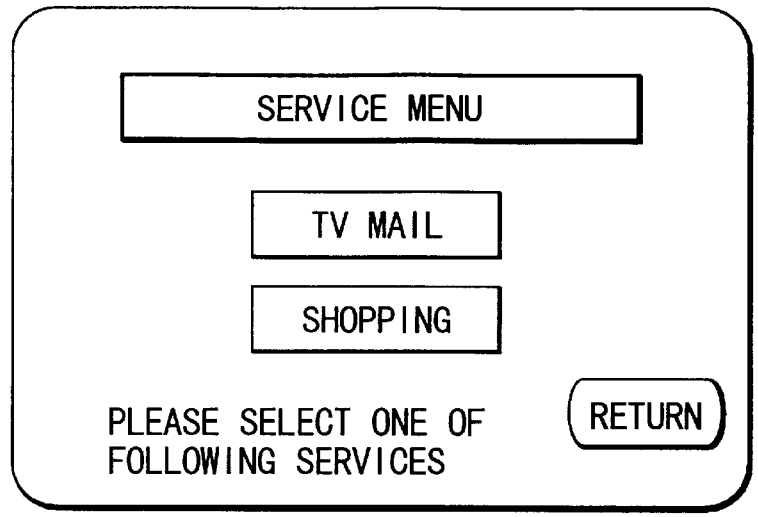
FIGS. 6A to 6C are diagrams showing the screen structure relating to provision of a mail service according to the first embodiment.

When a request to display a service menu has been supplied to the interactive television 10 from the remote controller operating unit 16, the program controller 12 takes out screen information of the service menu shown in FIG. 6A from the information storing section 15 to supply the same to the data display unit 13 so that the service menu is displayed on the TV screen. The service menu screen has a list of names of services which can be provided.

Figure 6B:
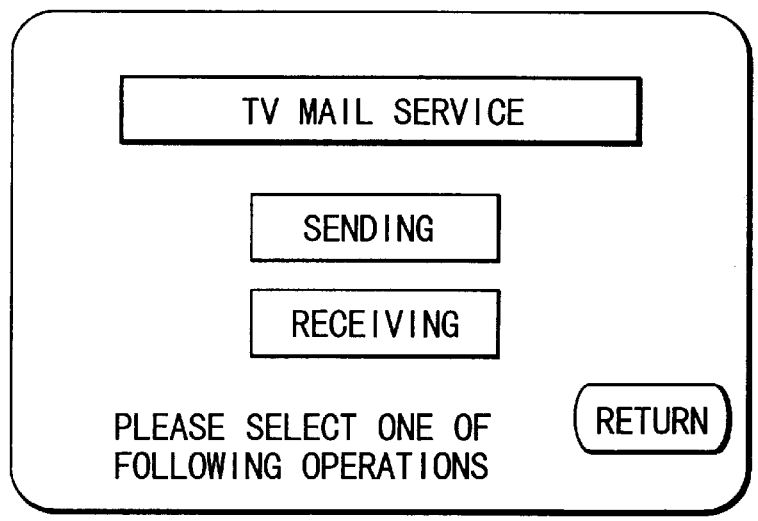

When "TV Mail" has been selected from the service menu screen shown in FIG. 6A as a result of the remote control operation, the TV mail service screen shown in FIG. 6B is displayed on the TV screen. Since a mail is required to be sent in this operation, "Sending" is selected from the TV mail service screen by a remote control operation. When "Sending" has been selected, the program controller 12 takes out the format of the TV mail sending screen shown in FIG. 6C from the information storing section 15 to supply the same to the data display unit 13 so that the format is displayed.

Then, a user writes required information in the destination area and the body area in the format of the TV sending screen by a remote control operation so as to make a TV mail document. The telephone number of the receiving-side user is input to the space for the destination and a message is input to the space for the body of the document.

Figures 7, 8:
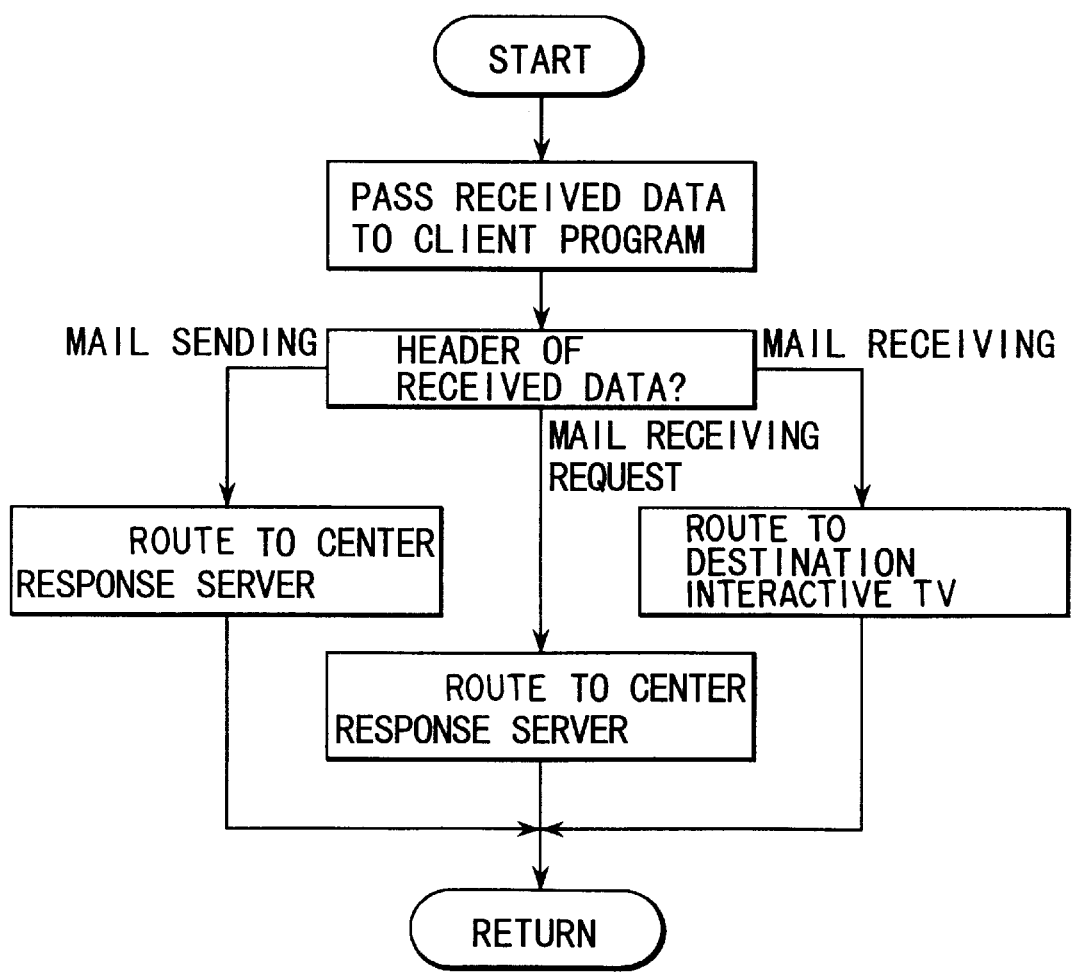
FIG. 7 is a diagram showing the data format of mail data according to the first embodiment.
FIG. 8 is a flow chart of an operation in a local response server according to the first embodiment.

When "Sending" has been selected from the TV mail sending screen, the program controller 12 makes mail data with the sending format shown in FIG. 7. That is, information indicating sending of a mail is provided for the sending header, the telephone number of the receiving-side user obtained by copying the destination information on the screen is provided for the destination, and the message written in the space for the body on the screen and obtained by copying is written to follow the foregoing telephone number. Thus-made mail data is supplied to the communication controller 14. Then, the communication controller 14 establishes the connection with the local response server 20 through a line so that mail data above is sent.

FIG. 8 is a flow chart showing the mail sending process and a main receiving process which are performed by the local response server 20.

The local response server 20 supplies mail data received from the interactive television 10 to the client program 22. If the client program 22 has detected that the supplied data is a sensing mail in accordance with the checked contents of the header of the mail data, the client program 22 supplies mail data above to the communication controller 21 so as to forward the same to the mail transfer program 33 of the center response server 30. The mail transference between the local response server 20 and the center response server 30 is performed through the corresponding communication controllers 21 and 34.

Figure 9:
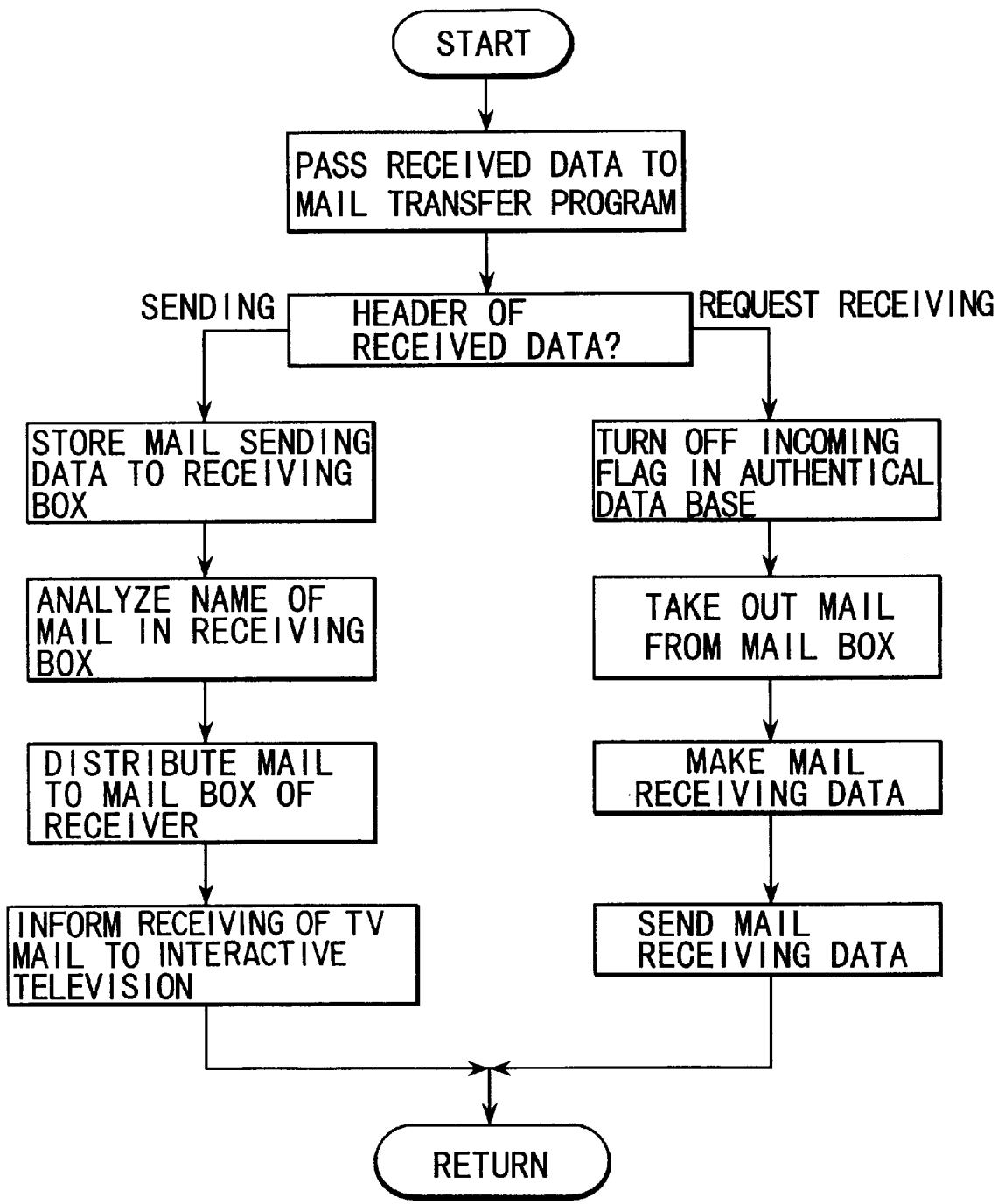
FIG. 9 is a flow chart of an operation in a center response server according to the first embodiment.

FIG. 9 is a flow chart showing a sending operation and a receiving request operation which are performed by the center response server 30.

The center response server 30 supplies the mail data supplied from the local response server 20 to the mail transfer program 33. If the mail transfer program 33 determines that the supplied data is a sending mail in accordance with the checked contents of the header of the mail data, the mail transfer program 33 stores the mail data in the receiver mail box 36.

The mail distribution program 39 periodically confirms the contents of the receiver mail box 36. If a mail data is stored, the mail distribution program 39 takes out the stored mail data to perform development of the address, development of the sender and storage into the receiver mail box. The development of the destination is performed such that the telephone number of the destination is instructed to the name analysis server program 38 to request analysis of name.

When data search for the development of the destination has been requested from the mail distribution program 39, the name analysis server program 38 uses the telephone number of the destination as a key to take out personal information of the receiver from the authentication database 35 so as to supply the user ID to the mail distribution program 39. Moreover, the name analysis server program 38 turns on "receiving flag" in personal information above. Personal information having the receiving flag, which has been operated, is reflected to the authentication database 35.

The name analysis server program 38 performs the development of the sender requested from the mail distribution program 39 with the instructed user ID of the sender such that the name analysis server program 38 uses the user ID of the sender as a key to take out name and address of the sender from the authentication database 35 so as to supply the same to the mail distribution program 39.

The mail distribution program 39 uses name and address of the sender obtained in the development of the sender and the body of the mail data to make a receiving mail. Then, the mail distribution program 39 stores the receiving mail in the mail box 37 having the user ID of the receiver obtained in the development of the destination. FIG. 4 shows a state where a TV mail has been supplied to a receiver having user ID=1111 from Mr. Miura, Hamura City.

When the receiving mail has been stored in the mail box 37, a line is connected to the telephone number of the receiver of the receiving mail of the mail box 37 through a local response server to notify supply of the TV mail.

The process for receiving a TV mail will now be described.

Figure 10A:
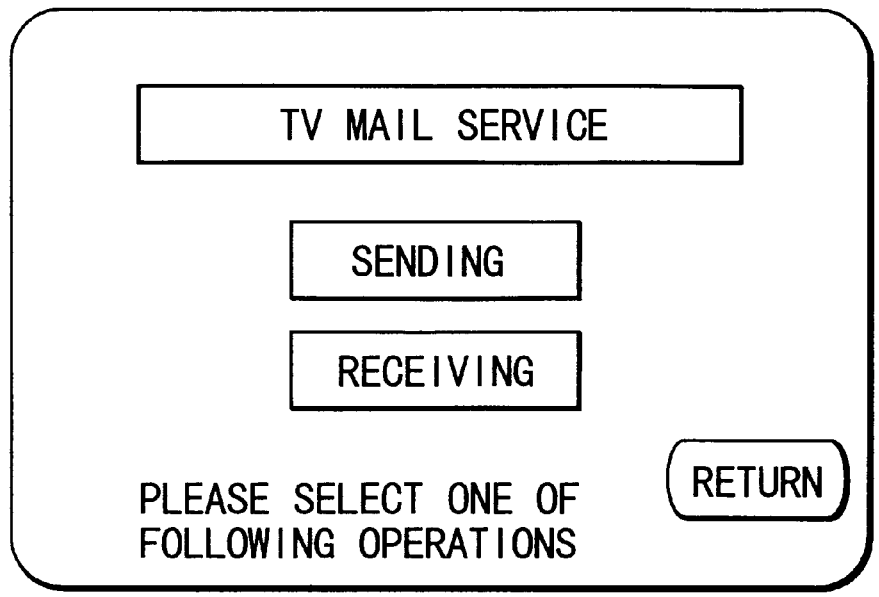
FIGS. 10A and 10B are diagrams showing the screen structure for receiving the mail service according to the first embodiment.

As shown in FIG. 5, when a user supplied with notification of receiving opens the TV mail sending screen of the interactive television 10 and selects "receiving", the process starts. The operation which is performed until the TV mail sending screen is opened is similar to that which is performed when "sending" is performed. FIG. 10A is a diagram showing a state where "receiving" has been selected on the TV mail sending screen displayed on the interactive television 10.

When the "receiving" has been selected on the TV mail sending screen, the program controller 12 of the interactive television 10 supplies mail receiving request data in a predetermined format to the client program 22 of the local response server 20 through the communication controller 14. FIG. 11 is a diagram showing the data structure of mail receiving request data above. The header of the mail receiving request data is provided with information indicating mail receiving request. Moreover, user ID (ID=1111) given to the interactive television 10 of the receiver is provided next to information above.

As shown in FIG. 8, when the local response server 20 has received mail receiving request data from the interactive television 10, the client program 22 checks the contents of the header of the mail receiving request data to determine that data is the mail receiving request. If the client program 22 has determined that data is the mail receiving request data, the client program 22 forwards mail receiving request data to the mail transfer program 33 of the center response server 30.

As shown in FIG. 9, when the mail transfer program 33 of the center response server 30 has checked the contents of the header of the mail receiving request data and determines data to be the receiving request, the mail transfer program 33 communicates the user ID number provided for the mail receiving request data to the name analysis server program 38. The database operation function of the name analysis server program 38 is used to turn off the "receiving flag" provided for personal information of the user who has requested receiving and which has been stored in the authentication database 35.

The mail transfer program 33 takes out received mail from the mail box 37 having the user ID provided for the mail receiving request data to make mail data. FIG. 12 is a diagram showing the data format of mail data. The header of mail data above has information indicating mail receipt, the user ID for the mail box is provided for the destination and the contents of the mail box are described in the destination and the body. Mail data, which has been made as described above, is returned to the local response server 20 covering the receiver. Thus, the line is connected to the telephone number which is the destination so that the local response server 20 interchanges mail data to the interactive television 10.

Figure 10B:
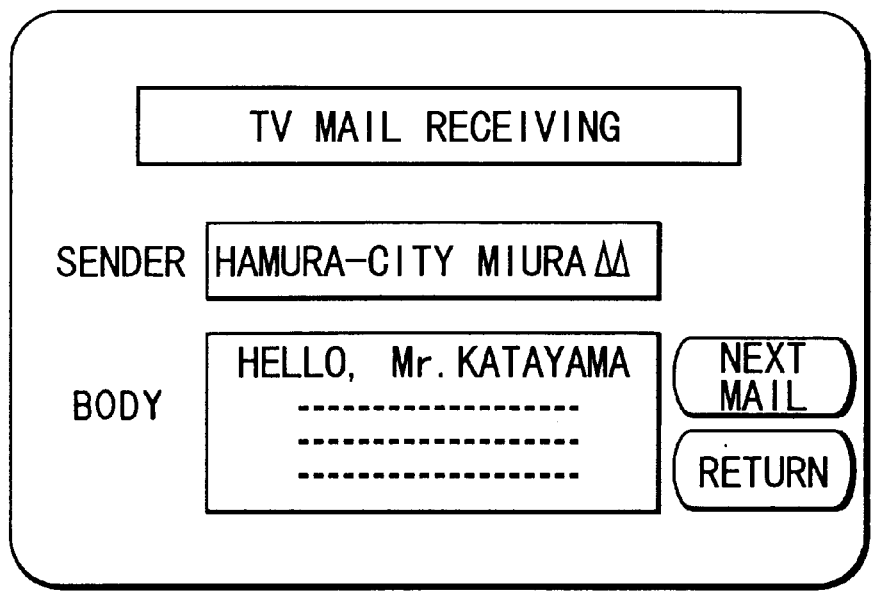

The interactive television 10 displays received mail in accordance with the contents of the supplied mail data. FIG. 10B is a diagram showing an example of the displayed mail which has been received as described above.

As described above, according to the first embodiment, the interactive television 10 for home use is enabled to be connected to the local response servers 20 and 30 through a telephone line. A TV mail supplied from the interactive television 10 as response data is received by the local response servers 20 and 30 so as to be stored. Moreover, a mail is sent to the destined interactive television 10 to meet the request from the interactive television 10 to receive the mail. Therefore, an electronic mail can easily be sent from the home-use interactive television 10 or the same can be received by the interactive television 10. Since the mail box 37 for the receiver is provided for the center response server 30, the mail can be distributed later even if the interactive television 10 has been switched off.

(Second Embodiment)

The second embodiment has a structure such that the center response server 30 is provided with a function for limiting transference of mail data from the interactive television 10.

A first means for limiting transference of mail data is structured such that an "authorized sender list" having identification numbers of users permitted to send electronic mails is provided for the authentication database 35, as shown in FIG. 13.

The "authorized sender list" is registered from the interactive television 10. A screen for accepting registration of the "authorized sender list" is displayed on the interactive television 10 to cause the user ID, the telephone number or name of the user required to be authorized to be input to forward, to the center response server 30, a request to be registered in the "authorized sender list". A list registration request data in the data format as shown in FIG. 14 is forwarded to the center response server 30.

In the center response server 30, the communication controller 34 supplies list registration request data to the server program through a program having a function capable of determining the contents of the header. Then, the server program registers the authorized sender list (the user ID) provided for the present list registration request data to the authorized sender list having user IDs. If the authorized sender list in the list registration request data is in the form of information (name, telephone number or the like) except for the user ID, the user ID is requested to the name analysis server program 38.

When the mail distribution program 39 has received mail data, the mail distribution program 39 requests the name analysis server program 38 to supply personal information of the receiver which is made to be the destination to determine that the user ID of the sender has been registered in the authorized sender list. If the user ID has been registered, a mail is sent similarly to the first embodiment. If the user ID of the sender is not registered in the authorized sender list, present mail data is abolished and abolition is notified to the sender.

A second means for limiting transference of mail data is structured such that a "rejected sender list" to which a list of identification numbers of persons who are rejected from receipt of electronic mails has been registered is provided for the authentication database 35, as shown in FIG. 15.

The process for registering the "rejected sender list" is similar to the process which is performed by the first means such that list registration request data shown in FIG. 16 is forwarded to the center response server 30 so as to be provided for a predetermined position in the authentication database 35.

When the mail distribution program 39 has received mail data above, the mail distribution program 39 requests the name analysis server program 38 to supply personal information of the receiver which is the destination to determine whether or not the user ID of the sender has been registered in the rejected sender list. If it has been registered, mail data is abolished and abolition is notified to the sender. If the user ID of the sender is not registered to the rejected sender list, the mail is forwarded similarly to the first embodiment.

According to the second embodiment, a problem in that an electronic mail, which is noise for a receiver, is unintentionally received in the mail box of the receiver can be prevented. Thus, only electronic mails required for a user can be received. Therefore, the communication cost can be reduced and the capacity of the mail box can effectively be used.

(Third Embodiment)

Figure 17:
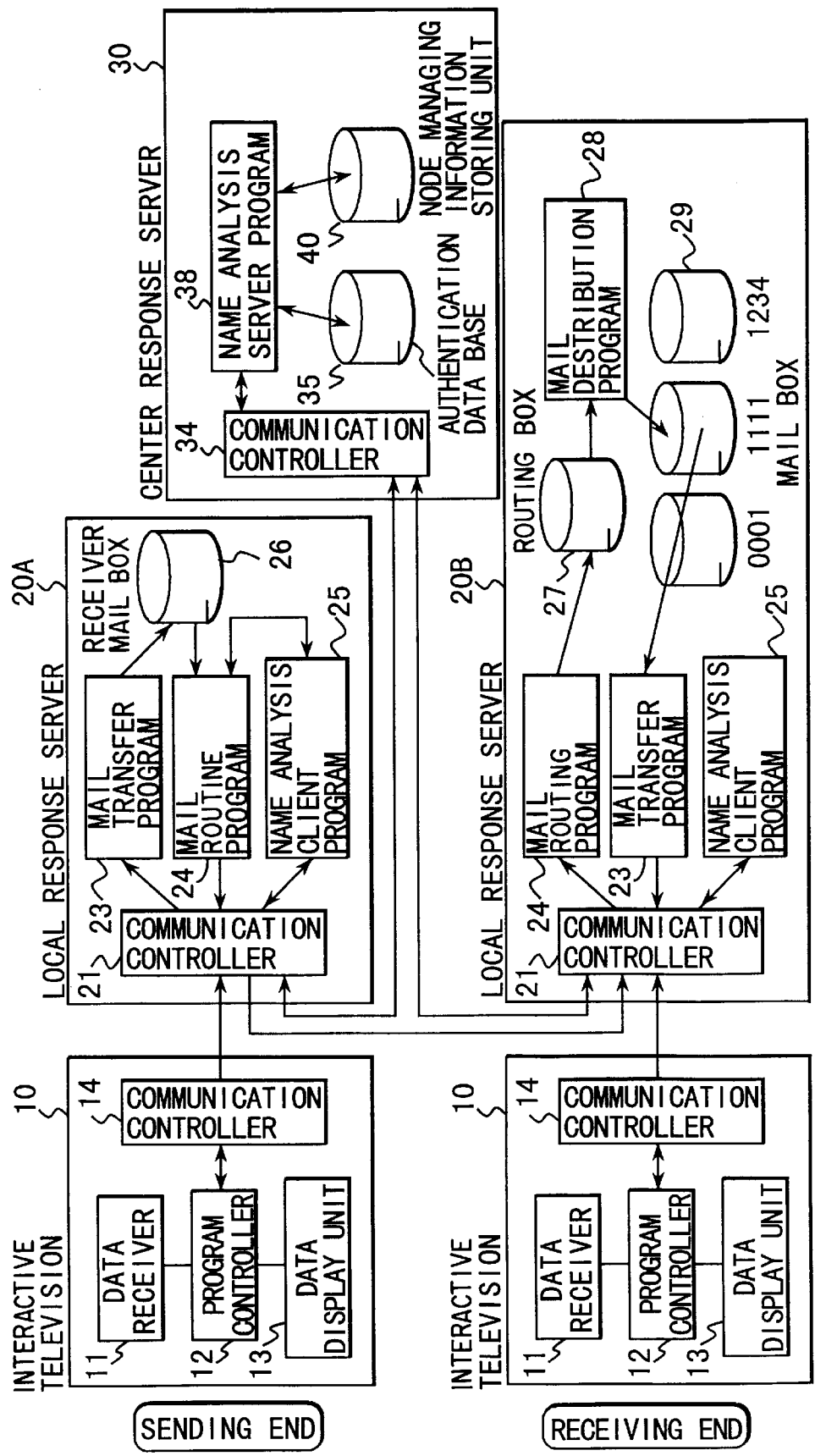
FIG. 17 is a diagram showing the structure of a TV mail system according to a third embodiment of the present invention.

FIG. 17 is a diagram showing the structure of a TV mail system according to a third embodiment of the present invention.

The third embodiment has a structure such that local response servers are connected to each other through the communication controller so that a network structure is formed because a mail must be interchanged between the local response servers due to respective provision of the TV mail function for each local response server.

The TV mail system according to the third embodiment is composed of interactive televisions 10, local response servers (20A and 20B) and a center response server 30. The local response server 20 is provided with mail forward, interchanging and distribution functions, while the center response server 30 is provided with a node managing function and an authentication function.

FIG. 17 is a diagram showing functions of local response servers 20A and 20B required in a case where the local response server 20A serves as a sending side and the local response server 20B serves as a receiving side. However, a structure in which the sender and the receiver are reversed may be employed, two serves 20A and 20B have the same functions.

The sending-side local response server 20A uses functions of a communication controller 21, a mail transfer program 23, a mail routing program 24, a name analysis client program 25 and a receiver mail box 26. The receiving-side local response server 20B uses functions of the communication controller 21, the mail transfer program 23, the mail routing program 24, the name analysis client program 25, an routing box 27, a mail distribution program 28 and a mail box 29.

The center response server 30 is provided with a communication controller 34, a name analysis server program 38, an authentication database 35 and a node managing information storing unit 40. FIG. 18 is a diagram showing the data structure of a authentication database 35. The authentication database 35 has, in addition to personal information of users and mail receiving information, IDs of local response servers covering the interactive televisions of users. FIG. 19 is a diagram showing the data structure of node managing information stored in the node managing information storing unit 40. Node managing information is composed of IDs of local response servers network addresses.

FIG. 20 is a diagram showing the structure of a mail routing box 27 arranged to be used by the receiving-side local response server 20. The routing box 27 stores destinations, senders and bodies. As each sender, address and name of a sender which can be obtained from development of the sender are registered.

The operation of the TV mail system having the above-mentioned structure will now be described.

Since this embodiment has the structure such that the functions provided for the center response server according to the first embodiment are assigned to local response servers, the interactive television 10 performs operations for sending and receiving TV mails similarly to that according to the first embodiment. That is, the interactive television 10 performs sending/receiving operations in accordance with the flow chart shown in FIG. 5.

Initially, "sending" will now be described. In accordance with the flow chart shown in FIG. 5, the interactive television 10 forwards mail data in the data format shown in FIG. 7 is forwarded to the sending-side local response server 20A.

In the sending-side local response server 20A, the communication controller 21 checks the header region of received data to supply received data to any one of a mail transfer program, a mail routing program or a name analysis client program in accordance with the contents of the header region. If received data is mail data or mail data, the communication controller 21 forward data above to the mail transfer program 23. If received data is mail routing data, the communication controller 21 forwards it to the mail routing program 24. If received data is name analysis result data, the communication controller 21 forwards it to the name analysis client program 25.

Figure 21:
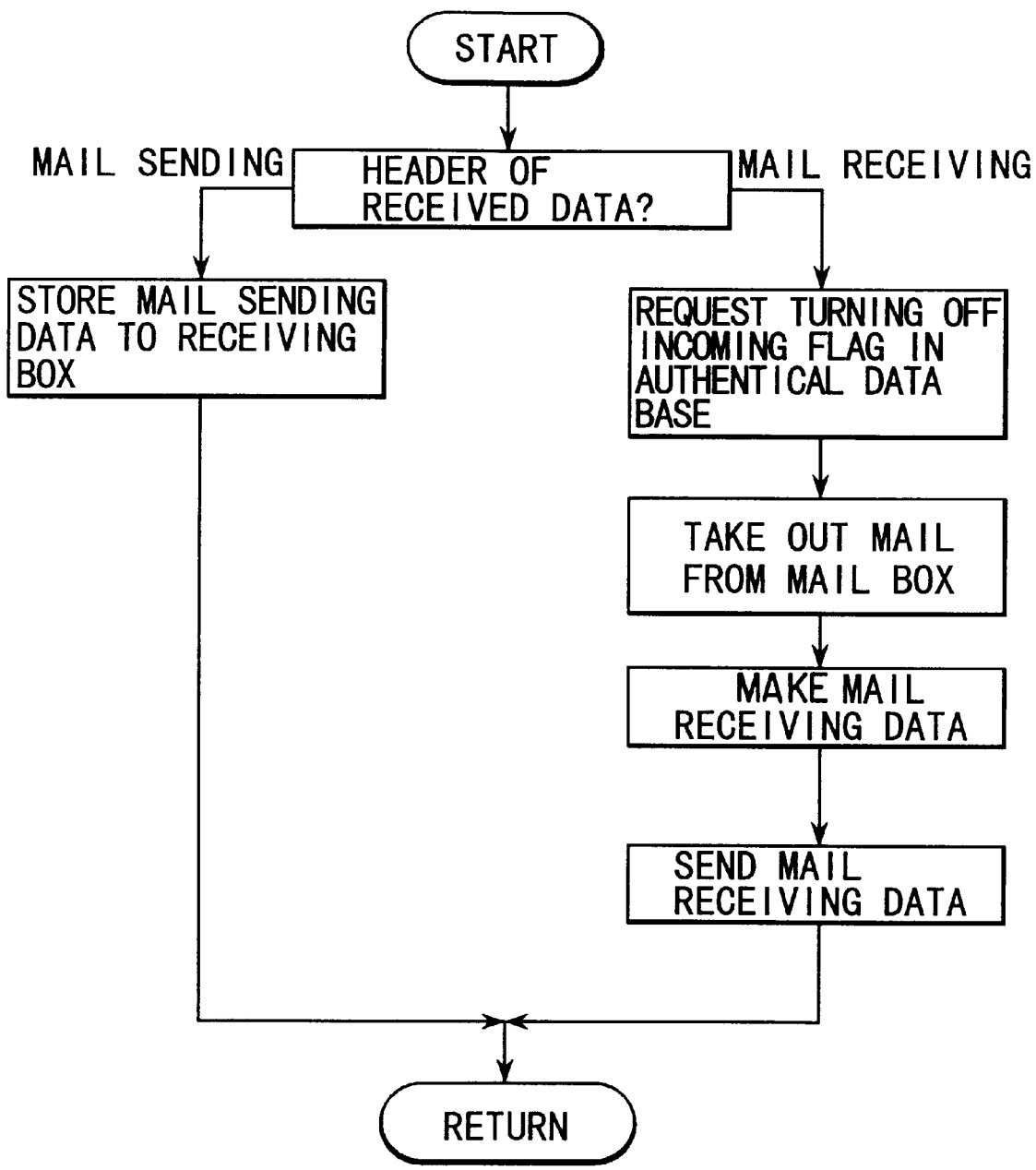
FIG. 21 is a flow chart for a mail transfer program according to the third embodiment.

Since data is mail data in this case, data is forwarded to the mail transfer program 23. The mail transfer program 23, which has received mail data, checks the contents of the header of mail data in accordance with a flow chart shown in FIG. 21. If data above is sending mail, the mail transfer program 23 stores received mail data in the receiver mail box 26.

The mail routing program 24 periodically confirms the contents of the receiver mail box 26. If the mail routing program 24 has confirmed that mail data has been stored in the receiver mail box 26, the mail routing program 24 starts performing processes (a) to (c) in accordance with a flow chart shown in FIG. 22.

(a) Development of destination and acquirement of ID of local response server to which the destined interactive television belongs;

(b) Development of sender; and (c) Route to local response server.

The processes (a) and (b) are performed by using the name analysis server program 38 of the center response server 30. Data communication with the name analysis server program 38 is performed by using the mail routing program 24 and the communication controllers 21 and 31.

Figures 25, 26:
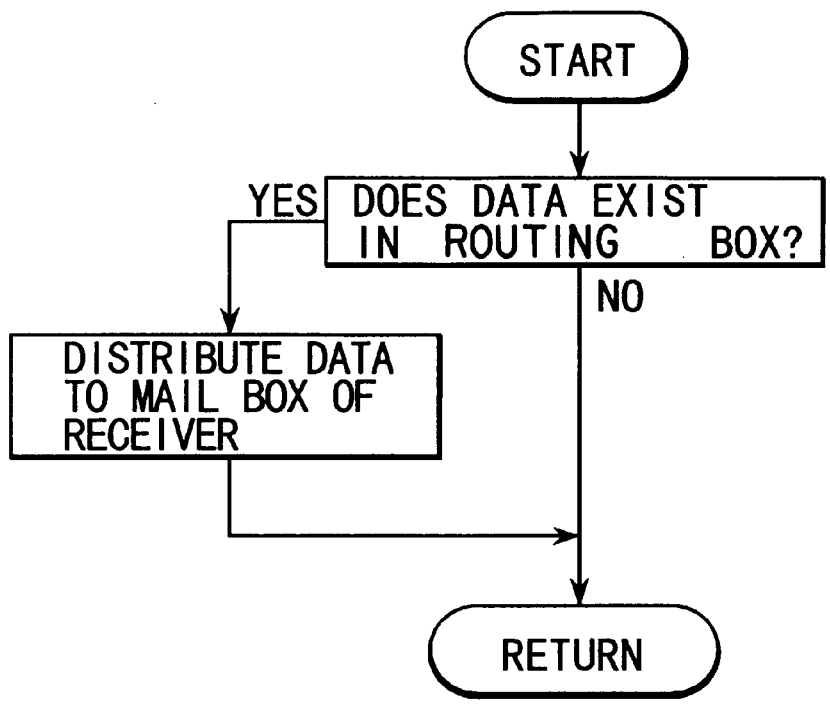
FIG. 25 is a flow chart for a mail distribution program according to the third embodiment.
FIG. 26 is a diagram showing the data format for name analysis request data.

The development of the destination is performed such that a request is made from the mail routing program 24 to the name analysis client program 25 to analyze name. The name analysis client program 25 requested to analyze name makes name analysis request data in accordance with a flow chart shown in FIG. 23. FIG. 26 is a diagram showing the data format of the name analysis request data. The destined telephone number of mail data is provided for name analysis request data. Name analysis request data is forwarded to the center response server 30 after the line connection has been established between the communication controller 21 and the communication controller 34.

Figure 24:
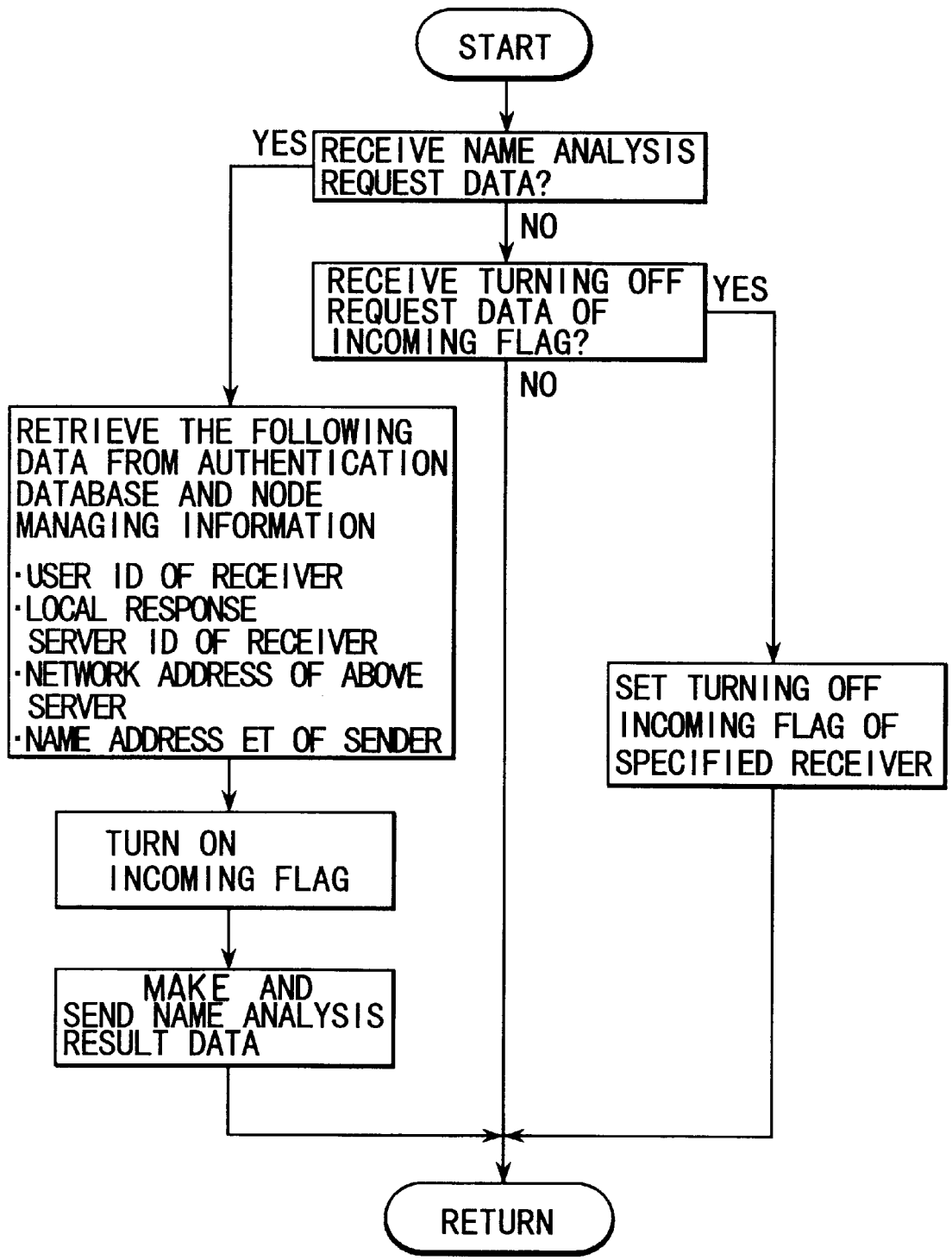
FIG. 24 is a flow chart for a name analysis server program according to the third embodiment.

In the center response server 30, name analysis request data is forwarded to the name analysis server program 38 if the header of data analyzed by the communication controller 34 makes a request to analyze name. FIG. 24 is a diagram showing the contents of a process which is performed by the name analysis server program 38. The name analysis server program 38 uses the destined telephone number provided for name analysis request data as a key to acquire, from the authentication database 35, the ID of the receiving-side user and the ID of the receiving-side local response server 20B. The development of the sender is performed such that the user ID of the sender is used as a key to acquire name and address of the sender from the authentication database 35. Moreover, the ID of the receiving-side local response server 20B is used as a key to acquire network address of the receiving-side local response server 20B from the node managing information storing unit 40. Moreover, the "receiving flag" of the receiver on the authentication database 35 is turned on.

The name analysis server program 38 forms the user ID of the receiver, name and address of the sender, the ID of the receiving-side local response server 20B and the network address of the receiving-side local response server 20B forms into name analysis result data in the format shown in FIG. 27 so as to forward the same to the sending-side local response server 20A.

In the sending-side local response server 20A, the communication controller 21 interprets the header to supply name analysis result data to name analysis client program 25. The name analysis client program 25 supplies received name analysis result data to the mail routing program 24.

Figure 22:
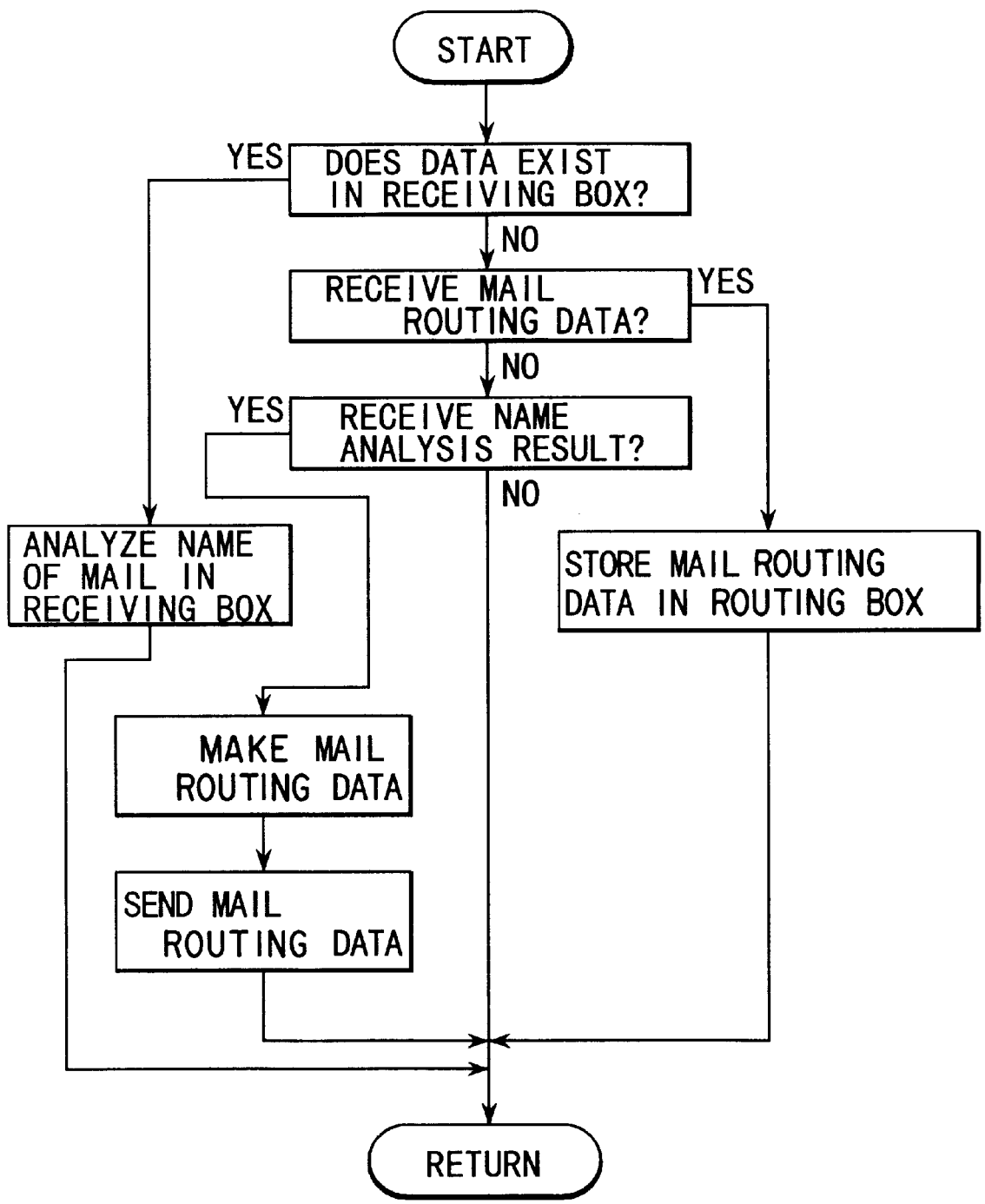
FIG. 22 is a flow chart for a mail routing program according to the third embodiment.

When the mail routing program 24 has received the name analysis result data as shown in FIG. 22, the mail routing program 24 makes a mail routing data in the data format shown in FIG. 28. Mail routing data has information including the ID of the local response server, which is an interchange server, and provided for the name analysis result data. Mail routing data above is then interchanged to the destined local response server. The interchange is performed by using the network address acquired in the process (a).

In the receiving-side local response server 20B which has received mail routing data, the communication controller 21 supplies mail routing data to the mail routing program 24. The mail routing program 24 checks the contents of the header of mail routing data above. If data above is mail routing data, the mail routing program 24 stores received mail routing data in the routing box 27.

The mail distribution program 28 periodically confirms the contents of the routing box 27. If mail routing data is stored in the routing box 27, the mail distribution program 28 takes out and stores it in the mail box 29 indicated by the user ID which is the destination.

The process for receiving a mail will now be described.

When the "mail receiving" screen has been called, the program controller 12 of the interactive television 10 forwards mail receiving request data to the mail transfer program 23 of the local response server 20B through the communication controller 14. The data structure of the mail receiving request data is as shown in FIG. 11. The process until the foregoing operation is performed is the same as that according to the first embodiment.

In the receiving-side local response server 20B, the mail transfer program 23 checks the contents of the header of the mail receiving request data. If supplied data is the mail receiving request, the mail transfer program 23 requests the name analysis server program 38 through the name analysis client program 25 to perform a process for turning off the receiving flag of the authentication database of the user indicated with the receiver ID of the mail receiving request data.

The mail transfer program 23 takes out the received mail from the mail box 29 indicated with the receiver ID to make mail data. Mail data is forwarded to the program controller 12 of the interactive television 10. Data communication is performed by using the communication controllers 21 and 14.

The name analysis client program 25 requested to turn off the receiving flag makes receiving flag turning off request data in the format shown in FIG. 29 to forward the same to the center response server 30.

In the center response server 30 which has received receiving flag turning off request data, the name analysis server program 38 interprets the contents of the header of the receiving flag turning off request data to specify the receiving flag of the receiver by using the destination telephone number as a key and performs a process for turning off the receiving flag.

As described above, according to this embodiment, the mail boxes 29 of the receivers are dispersed to local response servers 20 so that the load for the center response server 30 is dispersed and reduced. Since the mail routing program 24 is provided with the function of converting the communication protocol to convert the protocol to another mail, mutual connection with the other mail can be performed.

(Fourth Embodiment)

The TV mail system according to a fourth embodiment has a structure such that the receiving flag is located in the mail box and the same is omitted from the authentication database.

Figure 30:
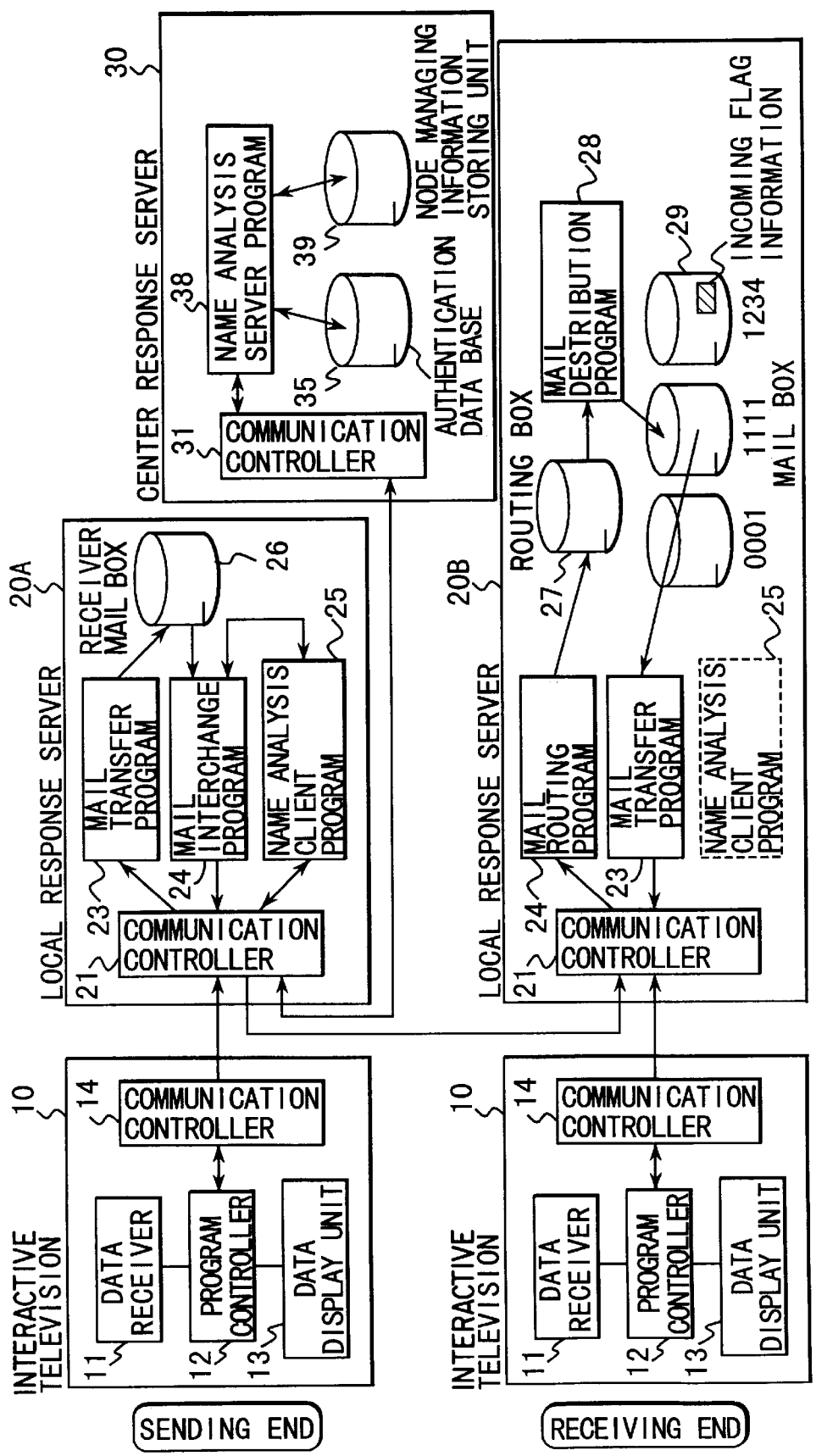
FIG. 30 is a diagram showing the structure of a TV mail system according to a fourth embodiment of the present invention.

FIG. 30 is a diagram showing the structure of a TV mail system according to the fourth embodiment. The TV mail system according to this embodiment basically has a network structure similar to the third embodiment and having interactive televisions 10, local response serves (20A and 20B) and the center response server 30 wherein local response servers are connected to each other by the communication controller.

In this embodiment, receiving flag information is provided for a mail box 28' which is used by the receiving-side local response server 20B. The name analysis client program of the receiving-side local response server 20B is not operated.

FIG. 31 is a diagram showing the data structure of a authentication database 35' provided for the center response server 30. The authentication database 35' has a structure similar to that according to the third embodiment shown in FIG. 8 except the receiving flag being omitted.

FIG. 32 is a diagram showing the data structure of a mail box 29' for the receiver provided for the local response server 20. The mail box 29' of the receiver is additionally provided with an receiving flag.

Figure 23:
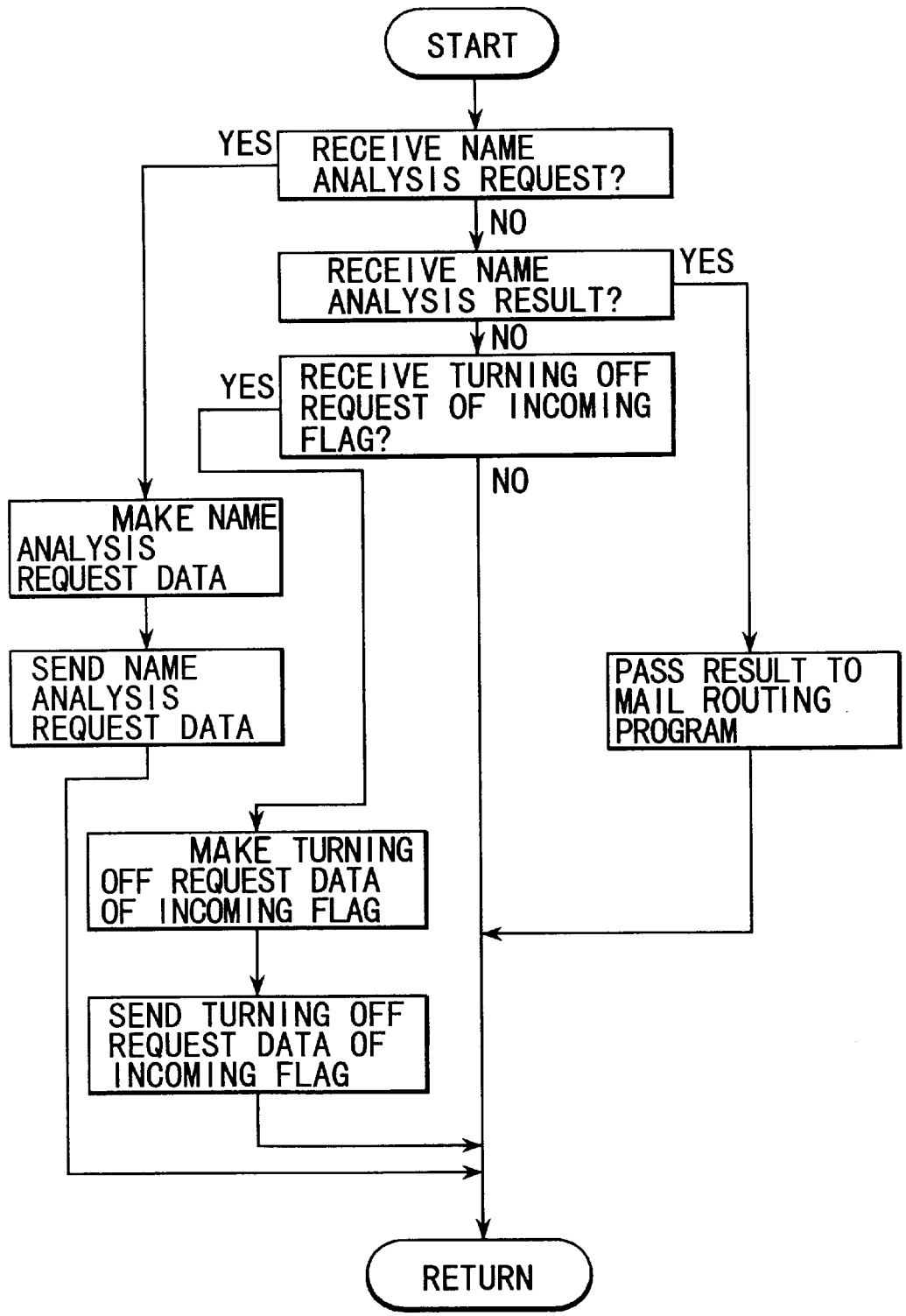
FIG. 23 is a flow chart for a name analysis client program according to the third embodiment.

In this embodiment having the above-mentioned structure, mail communication is performed similarly to the third embodiment. That is, in the sending-side local response server 20A which has received mail data from the interactive television 10, the mail transfer program 23 stores mail data in the receiver mail box 26, as shown in FIG. 23, and then requests the name analysis client program 25 to analyze name. The name analysis client program 25 is operated in accordance with a flow chart shown in FIG. 34 to make name analysis request data to request the center response server 30 to develop the sender and the like.

The center response server 30, which has received name analysis request data from the sending-side local response server 20A, performs a similar process to that according to the third embodiment except for the process for the receiving flag (the process for the receiving flag is omitted) to return a name analysis result to the sending-side local response server 20A.

In the sending-side local response server 20A which has received the name analysis result, the mail routing program 24 forwards the name analysis result to the mail routing program 24 so that mail routing data shown in FIG. 28 is forwarded to the receiving-side local response server 20B by using the network address.

Figure 35:
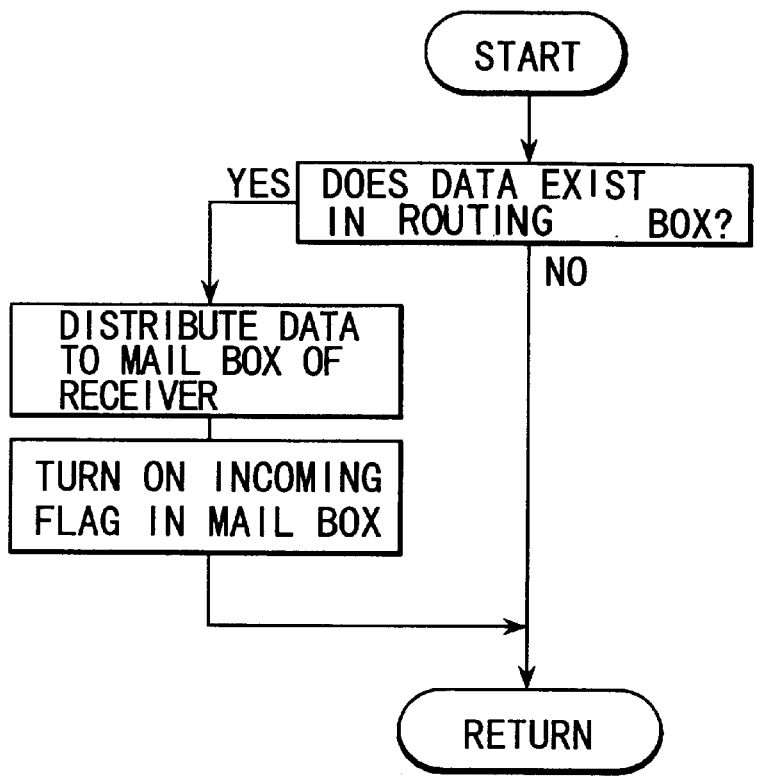
FIG. 35 is a flow chart for a mail distribution program according to the fourth embodiment.

In the receiving-side local response server 20B, the mail distribution program 28 stores mail routing data in the mail box 29', as shown in FIG. 35, and turns off the receiving flag in the mail box 29'. The mail transfer program 23 turns off the receiving flag in the mail box 29' in place of making a request to the name analysis client program 25 to perform the process for turning off the receiving flag. Thus, the name analysis client program 25 is not required to have the function to make the receiving flag turning off request data.

Figure 33:
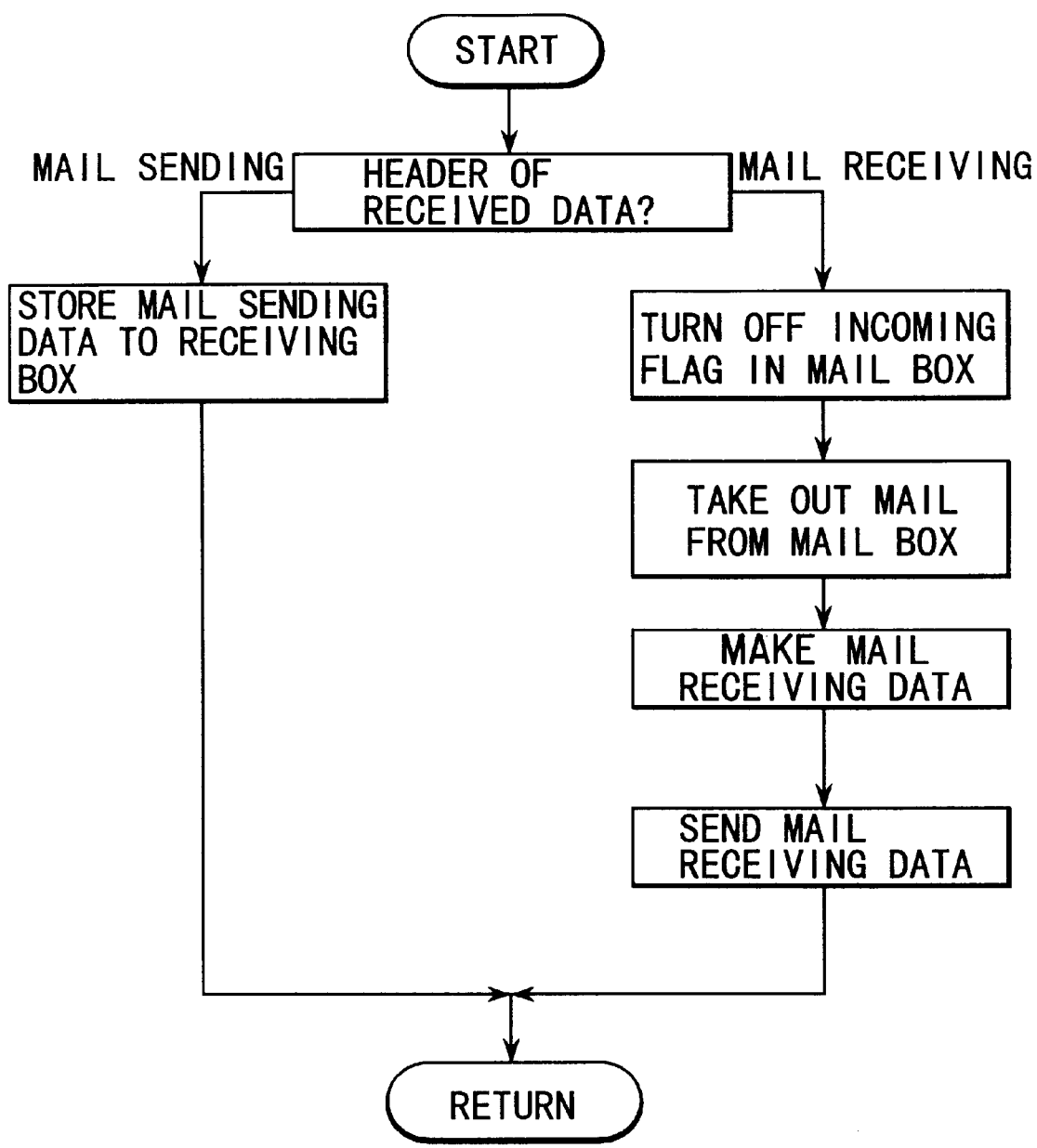
FIG. 33 is a flow chart for a mail transfer program according to the fourth embodiment.

When the receiving-side local response server 20B has received mail receiving request data from the receiving-side interactive television 10, the mail transfer program 23 turns off the receiving flag in the mail box for the address, as shown in FIG. 33, and takes out the mail from the mail box to make and send mail data to the receiver.

As described above, according to this embodiment, the operation for the receiving flag in the mail box of the receiving-side local response server 20B is operated. Therefore, the operation for tuning off the receiving flag is shifted to the local response server so that the quantity of communication with the center response server is reduced. Another advantage can be realized in that receiving can be confirmed simply by checking the mail box of the local response server.

(Fifth Embodiment)

The fifth embodiment relates to a service screen presentation method in which service screen information of a TV mail is stored in the response server to forward the same to the TV when a service is required. The structure of the TV mail system may be any one of the structures shown in FIGS. 1, 17 and 30.

Figure 36:
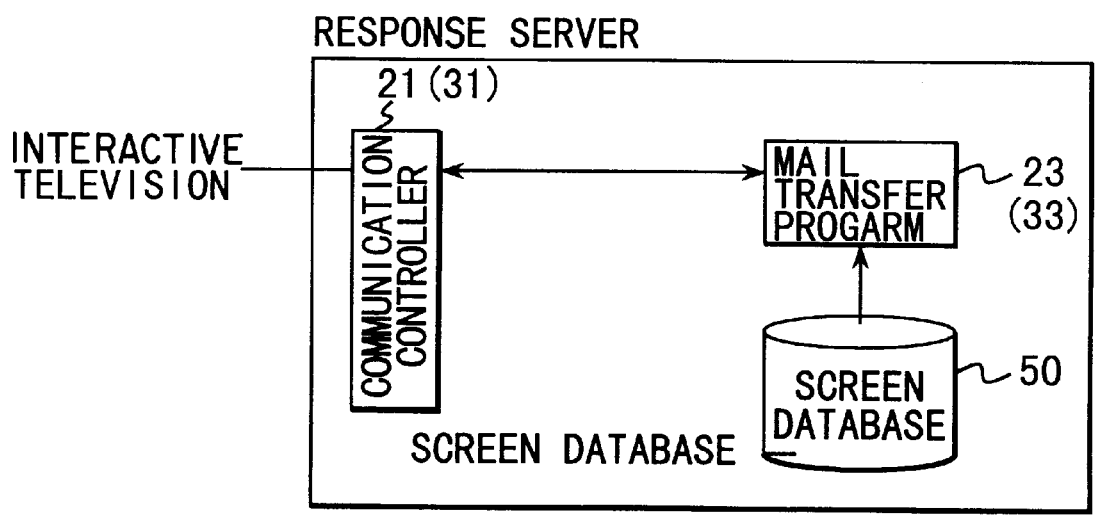
FIG. 36 is a diagram showing the structure of a response server according to a fifth embodiment of the present invention.

In this embodiment, a response server having the mail transfer program 23 is provided with a screen database 50 structured as shown in FIG. 36. Since the mail transfer program 23 may be provided for either the local response server 20 or the center response server 30 in this embodiment, the server is simply called a response server.

Figure 6C:
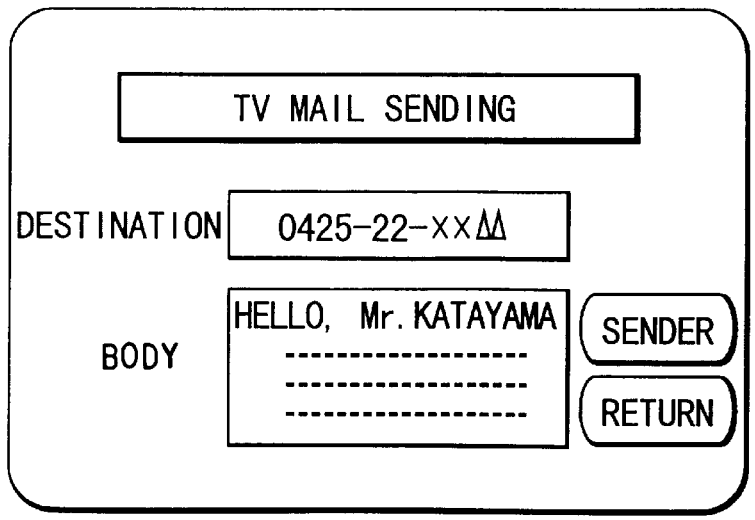

FIG. 37 is a diagram showing the data structure of the screen database. The screen type is permitted to select a service screen shown in FIGS. 6A and 6B, a sending screen as shown in FIG. 6C and a receiving screen as shown in FIG. 10B. Screen data for each screen is stored. The contents of the screen database 50 may be considered variously to correspond to the mail services presented by the TV mail system.

In this embodiment, when the program controller 12 of the interactive television 10 is requested to display a service screen of the TV mail as a result of the remote control operation performed by a viewer, the program controller 12 makes screen information request data as shown in FIG. 38. FIG. 38 is a diagram showing a format of screen information request data. Information indicating a request of a screen is provided for the header of the screen information request data, the user ID of the viewer is stored in the requestor and the specification of the screen specified by the viewer by the remote control operation is set. Screen information request data is forwarded to the mail transfer program 23 in the response server.

In the response server, screen information request data is forwarded from the communication controller 21 (31) to the mail transfer program 23. When the mail transfer program 23 has received screen information request data having a value indicating "screen request" in the header thereof, screen data indicated by the screen type is retrieved in the screen database 50. In accordance with a result of the retrieval, the mail transfer program 23 makes screen information data as shown in FIG. 39 to forward screen information data to the original interactive television 10.

When the program controller 12 of the interactive television 10 has received screen information data, stored screen data is displayed on the data display unit 13.

According to the above-mentioned embodiment, the screen database 50 of the response server is required to simply be updated even if the contents of the mail service, which is provided by the TV mail system, is changed to change the service screen or the like of the TV. The change of the contents, such as the service screen or the like, is not required to change each television to be adaptable to the change. Therefore, the change process can easily be performed. On the other hand, the method in which service screen of the TV mail is stored in the storing region of the television cannot update the menu if a necessity of updating the menu to be adaptable to an improvement in the service arises.

(Sixth Embodiment)

A sixth embodiment is structured such that typical bodies are previously prepared in order to simplify the operation for inputting the body of the mail in order to support the sentence processing operation which is performed by a user. The structure of the TV mail system may be any one of the structures shown in FIGS. 1, 17 and 30.

Figure 40:
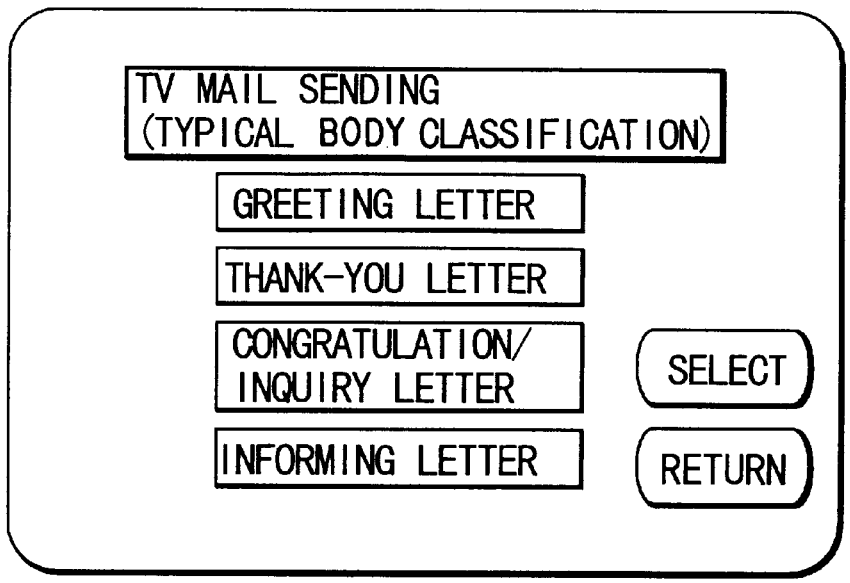
FIG. 40 is a diagram showing an example of display of typical body classification screen according to a sixth embodiment of the present invention.
Figure 41:
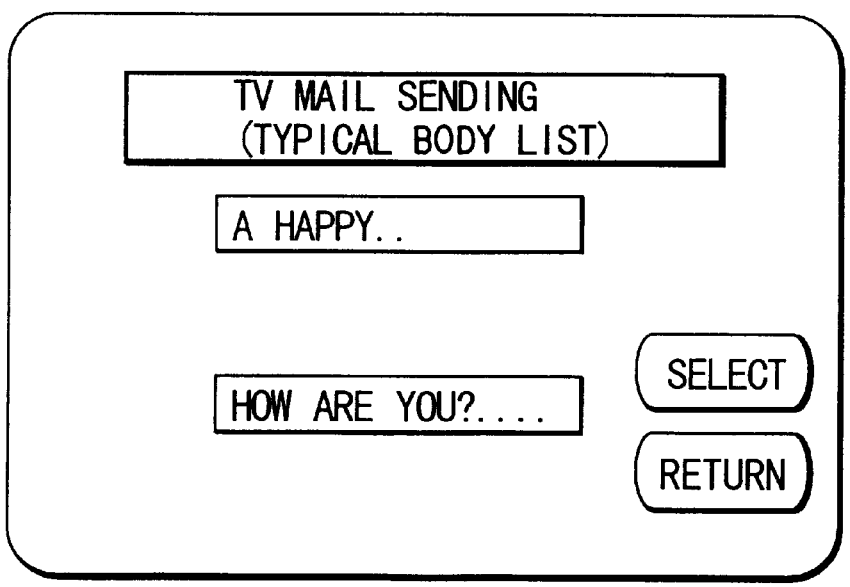
FIG. 41 is a diagram showing an example of display of typical body list according to the sixth embodiment.

FIG. 40 is a diagram showing an example of a classification screen for typical bodies which are displayed on the data display unit 13 of the interactive television 10. The typical bodies are classified into "greeting letters", "thank-you letters", "congratulation/inquiry letters" and "information letters". FIG. 41 is a diagram showing an example of a screen displaying a list of typical bodies on the data display unit 13 of the interactive television 10. Expected sentences are displayed in accordance with the classification above.

Classification information for typical bodies and information of typical bodies shown in FIGS. 40 and 41 are stored in the storing region of the interactive television 10. FIG. 42 is a diagram showing the structure of a storing region for classification information of typical bodies and information of typical bodies. The predetermined typical bodies are managed with classification information. Information of regions in which typical bodies are stored is provided for each classification.

Figure 43:
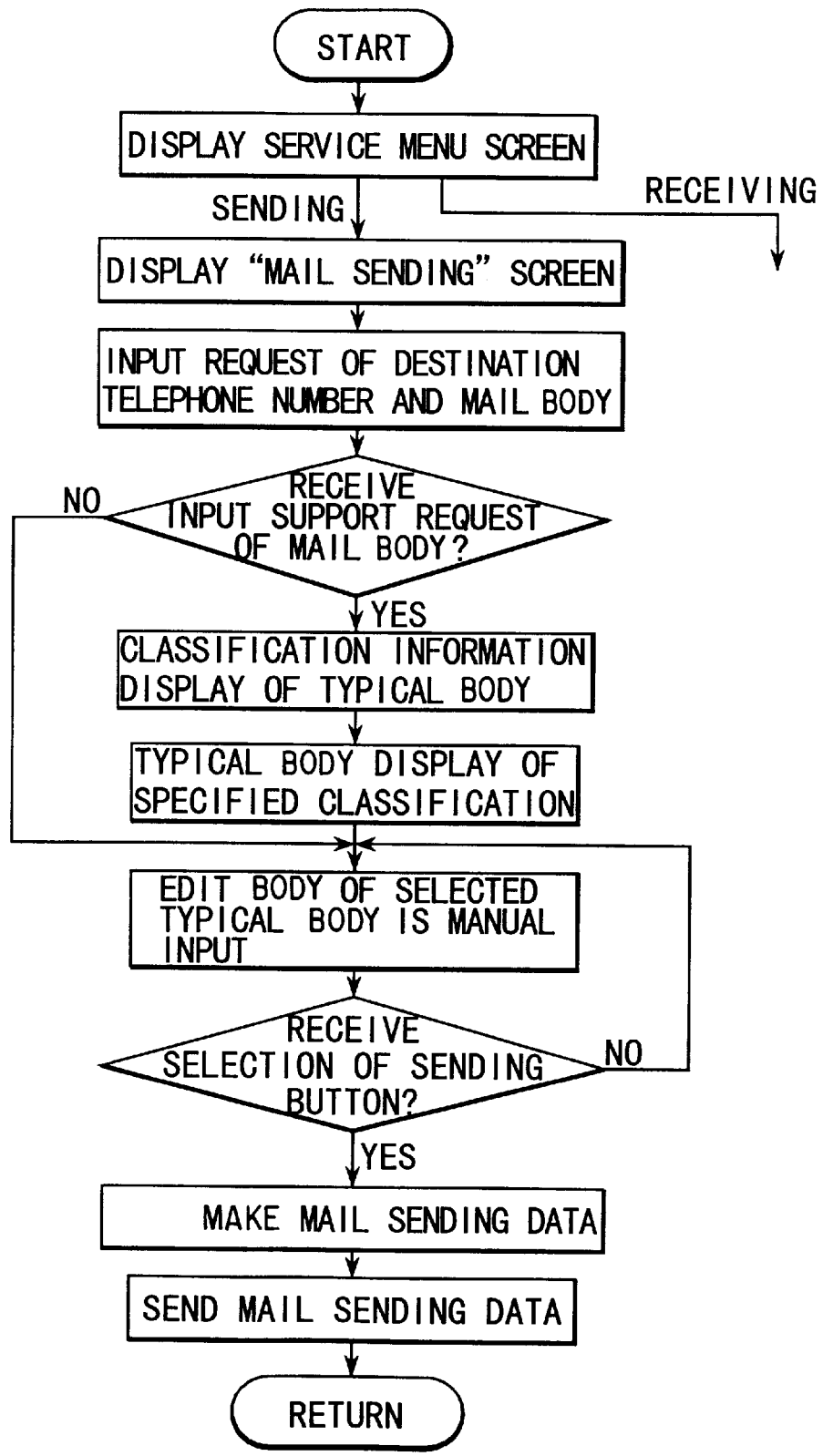
FIG. 43 is flow chart showing a interactive television according to the sixth embodiment.

A sending process is performed in the interactive television 10 in accordance with a flow chart shown in FIG. 43. When sending has been selected on the service menu screen, the program controller 12 displays a screen for sending a mail as shown in FIG. 6C to accept inputs of the destined telephone number and the body of the mail. At this time, if a request to support the operation for processing the body of the mail is made, classification information of typical bodies is read and a classification selection screen shown in FIG. 40 is displayed. If a specific classification is selected on the classification selection screen, typical bodies belonging to the classification are read and displayed as shown in FIG. 41. Then, the user selects an arbitrary document from a list of the typical bodies by a remote control operation. The program controller 12 makes mail data such that the typical body selected by the viewer is used as the body to forward mail data to the local response server.

According to the above-mentioned embodiment in which typical bodies are prepared to permit a user to select an arbitrary body to support the operation of the user to write a body of the mail, the operation for inputting the body of the mail can easily be performed by using a Japanese syllabary because a keyboard is not generally provided for a television.

Although the sixth embodiment is structured such that information, such as typical bodies, are stored in the storing region of the interactive television 10, information above may be stored in the response server similarly to the fifth embodiment.

(Seventh Embodiment)

A seventh embodiment has a structure such that a screen displayed on the data display section of the broadcasting television can be printed.

Figures 44, 45A, 45B:
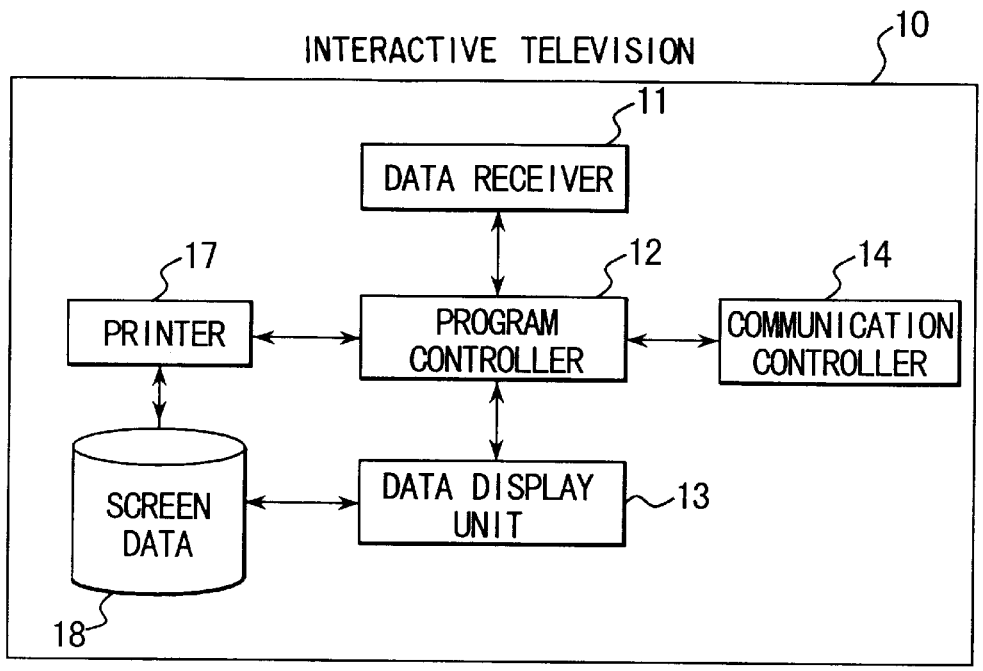
FIG. 44 is a diagram showing the structure of a interactive television according to the seventh embodiment of the present invention.
FIGS. 45A and 45B are diagrams showing data formats for mail data and mail data according to the seventh embodiment.

In the seventh embodiment, the interactive television 10 has a printer 17 having a printing function, as shown in FIG. 44. In the interactive television 10, a print command issued from a viewer by a remote control operation is received by a data receiver 11. Then, a program controller 12 requests the printer 17 to print data. The printer 17 reads screen data, which is being displayed on the screen, to read the same.

A portion of contents of mails are undesirable to be printed. Thus, a print inhibition mechanism is provided with which the sender is able to protect printing of mails of the foregoing type at the receiving-side.

Referring to FIGS. 45A and 45B, the print inhibition mechanism will now be described.

As mail data shown in FIG. 45A, a print permission flag is provided for mail data, which is sent from the sending-side interactive television 10, the print permission flag having a portion for inhibiting printing. Mail data above is forwarded to a local response server, to which the receiver belongs, by using the mail function according to any one of the foregoing embodiments. A print inhibition flag is provided for mail data which is forwarded from the receiving-side local response server to the receiving-side interactive television 10, the print inhibition flag having a value of the print inhibition flag of mail data above. As a result of the above-mentioned structure, printing of the contents displayed on the TV screen can be inhibited.

If the sender does not permit printing, a mail having the flag indicating inhibition of printing is sent. If the receiver attempts to print the contents of the mail, the program controller 12 interprets printing in the case where the contents are not permitted to be printed. According to the above-mentioned embodiment, a mail displayed on the television screen can be printed. Moreover, mails of a type having a copyright and required not to be printed cannot be printed attributable to the print inhibition function.

(Eighth Embodiment)

An eighth embodiment of the present invention will now be described such that the structure of the TV mail system shown in FIG. 1 is taken as an example.

The eighth embodiment has a structure having a function capable of writing a reply mail to a received mail. When a reply mail is written, the address of the sender of the mail is automatically provided for the address of the reply mail to reduce the load in the mail writing operation.

A mail receipt screen as shown in FIG. 46A is displayed on the television screen of the interactive television 10. The screen has a reply button which is depressed when reply is performed to a mail (to which reply is made among the displayed mails).

When the reply button has been depressed on the mail receipt screen, a mail reply screen shown in FIG. 46B is displayed. "Destination" on the mail reply screen is automatically provided with name of the sender of the received mail to which reply will be made.

Note that screen data for the mail receipt screen and the mail reply screen are stored in the server similarly to the fifth embodiment so as to be loaded down when a request has been made from the interactive television.

FIG. 49 is a diagram showing the data structure of a mail box 37' storing a received mail to which a reply is required to be made. A sender ID indicating the sender and type of the mail are added to the structure of the mail box 37 shown in FIG. 4. FIG. 50 is a diagram showing the data structure of the mail box 37' storing a reply mail. "Reply" is provided for the space for the mail specification.

In the above-mentioned embodiment, when the mail distribution program 39 of the center response server 30 takes out the received mail from the receiver mail box 36 to distribute the same to the mail box 37' of the receiver, name and the sender ID of the sender of the mail are written to the mail box 37'. If the received mail is not the reply mail, the specification is made to be "Original".

Figure 51:
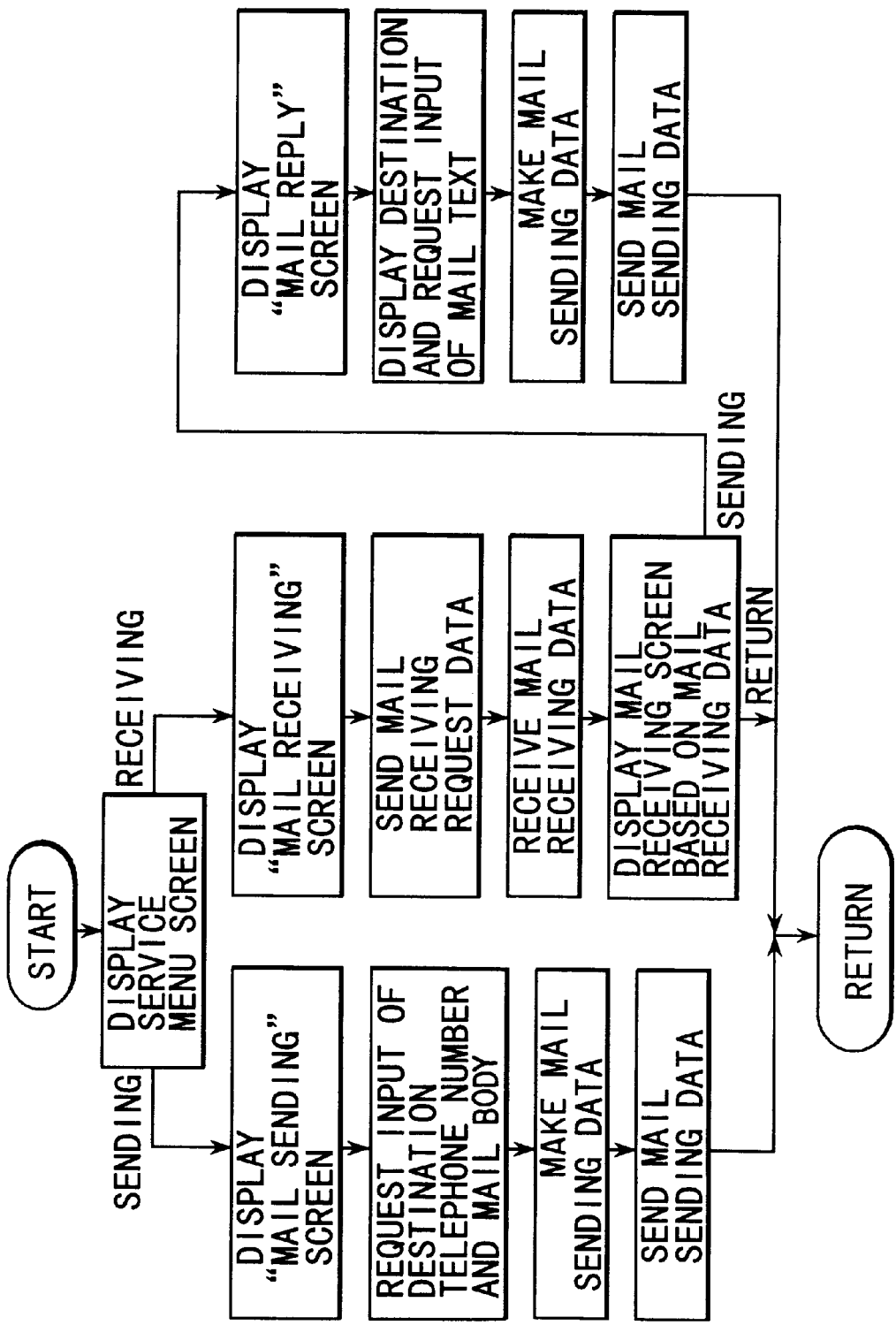
FIG. 51 is a flow chart of an operation in a interactive television according to the eighth embodiment.

In the receiving process which is performed in accordance with a flow chart shown in FIG. 51, when the program controller 12 of the interactive television 10 has sent mail receiving request data to the center response server 30, the center response server 30 takes out a received mail from the receiving-side mail box 37' to make a mail data in the data format shown in FIG. 47. Mail data to which the sender ID has been provided is forwarded to the receiving-side interactive television 10.

When the receiving-side interactive television 10 has received mail data in the format shown in FIG. 47 from the center response server 30, the interactive television 10 makes mail receipt screen shown in FIG. 46A on the basis of the contents of mail data, as shown in FIG. 51.

When a reply mail to the received mail displayed on the television screen is made by the user, the user selects the "Reply" button by a remote control operation.

When the program controller 12 has been notified from the data receiver 11 that the "Reply" button has been depressed on the mail receipt screen shown in FIG. 46A, the program controller 12 calls the data display unit 13 in order to display the mail reply screen such that name of the sender of the supplied mail is made to be the destination. When the user has input the body, the program controller 12 makes mail data. At this time, the sender ID of the received mail is provided as the destination, and "Reply" is provided as the specification. FIG. 48 is a diagram showing the data structure of the reply mail. The contents of the header are "Mail Sending". It means a fact that the foregoing mail is subjected to a process similar to that for a usual sending mail. A specification field is added to the data structure above, the specification field having a value indicating the reply. When the "Sending" button has been selected by the user who has written the reply mail by a remote control operation, mail data, which is the reply mail, is forwarded to the center response server 30.

In the center response server 30, the mail data, which is the reply mail, is stored in the mail box shown in FIG. 50.

According to this embodiment having the above-mentioned structure, since the sender ID has been stored, a labor for inputting the destination, required to write the reply mail, can be omitted. Moreover, since the reply mail stores specification data indicating the "Reply", a user who has received the mail is able to recognize that the mail is the reply mail.

(Ninth Embodiment)

A ninth embodiment of the present invention will now be described such that the structure of the TV mail system shown in FIG. 1 is taken as an example. The TV mail system according to the ninth embodiment has a function which is capable of forwarding a received mail to another user.

Initially, the structure of a mail receipt screen which is presented from the interactive television 10 to a user will now be described. FIG. 52 is a diagram showing a mail receipt screen. The mail receipt screen has a forward button. When a displayed and received mail (required to be forwarded) is forwarded, the transference button is depressed. FIG. 53 is a diagram showing the structure of a mail sending screen which is displayed when the transference button has been depressed on the mail sending screen. The mail sending screen has a space for inputting the original sender. The space for the original sender is arranged such that name of the sender of the received mail which is required to be forwarded, is automatically input. Image data above is stored in the server similarly to the fifth embodiment so as to be loaded down to meet a request from the interactive television.

FIG. 54 is a diagram showing the data structure of a forward mail. The data structure is formed such that a sender field is added to the specification field. Moreover, the specification has a value indicating the transference. FIG. 55 is a diagram showing the data structure of a mail box storing the forward mail. The mail box has a region for storing information of the original sender in addition to the sender ID and the specification.

A process according to this embodiment for forwarding a mail will now be described with reference to a flow chart of the interactive television shown in FIG. 56.

The description will be performed about a process from a moment at which the interactive television 10 has received a mail from the center response server 30 and a mail receipt screen shown in FIG. 52 is displayed on the data display unit 13. The process until the foregoing operations are performed is, as shown in a flow chart shown in FIG. 56, similar to that according to the first embodiment.

When a user requires to forward a received mail which has been read on the television screen to another user, the user is required to depress the transference button provided on the mail receipt screen by a remote control operation.

When the program controller 12 has been notified from the data receiver 11 that the "Transference" button has been depressed on the mail receipt screen, the program controller 12 starts performing the mail transference process. That is, a mail sending screen as shown in FIG. 53 is displayed in which name of the sender of the received mail is made to be the "original sender". At this time, the contents of the body of the received mail are displayed in the body and the sender of the forward mail is permitted to add a comment to the body.

When completion of input of the destination and the body has been determined in accordance with depression of the "Sending" button, a forward mail is made with the format shown in FIG. 54. At this time, "Transference" is provided for the specification space and sender of the received mail is provided for the space for the original sender. The forward mail is formed into mail data so as to be sent to the center response server 30.

In the center response server 30, the sent forward mail is stored in the mail box of the destined user. The forward mail stored in the mail box is as shown in FIG. 55 such that the "Specification" has been made to be "Transference". If the specification is "Transference", name of the sender of the forwarded mail is stored in the original sender field.

According to this embodiment having the above-mentioned structure provided with the function of forwarding the received mail to another user, a received mail can be forwarded. Since the forwarded mail is provided with information of "original sender" when stored in the mail box, the original sender of the forwarded mail can be detected.

(Tenth Embodiment)

A TV mail system according to a tenth embodiment has a function for storing a sending history of a main sender. The TV mail system according to the tenth embodiment is basically structured similarly to that shown in FIG. 1 except the center response server.

Figure 57:
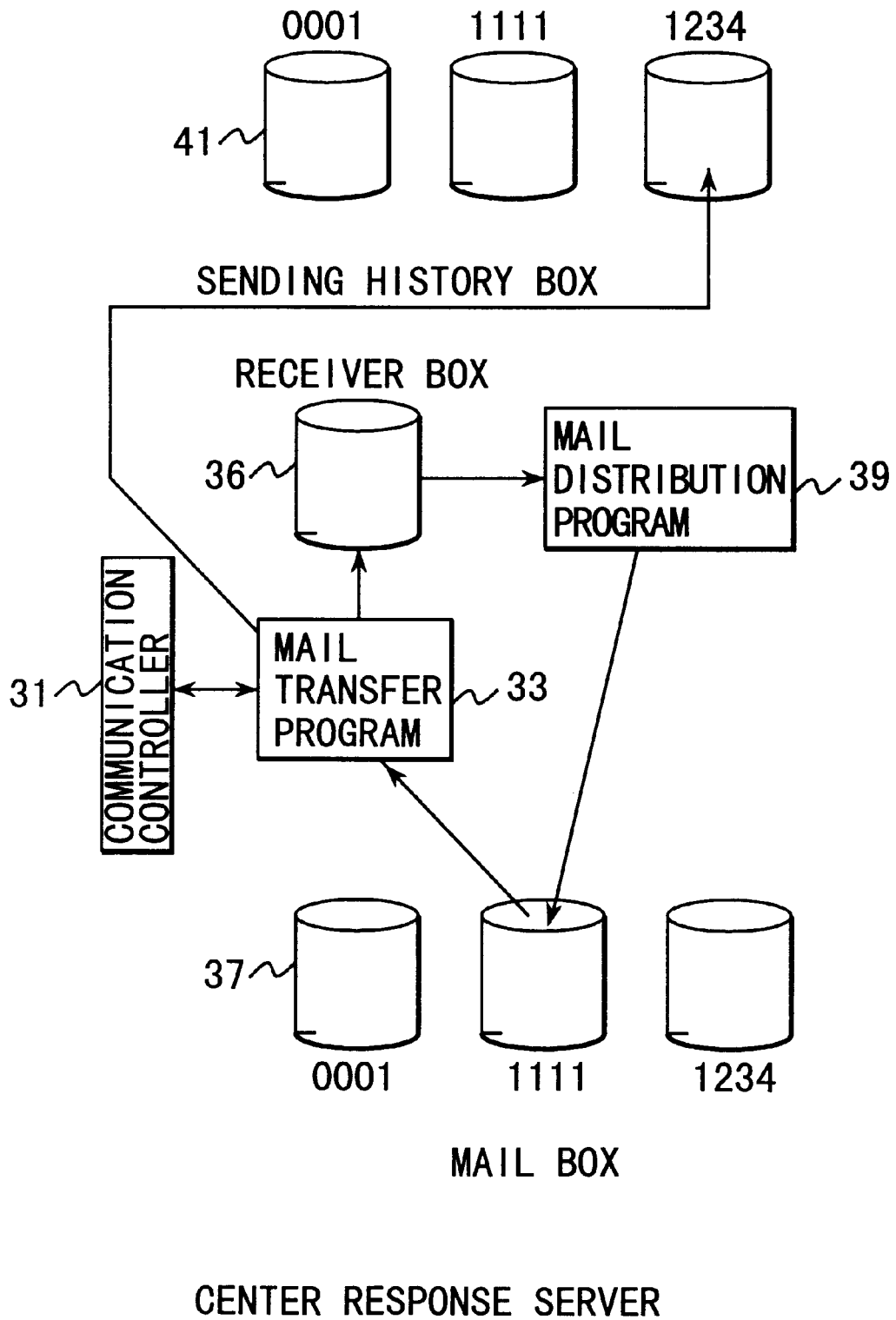
FIG. 57 is a diagram showing the structure of a center response sever according to a tenth embodiment of the present invention.

FIG. 57 is a diagram showing the structure of a center response server according to the tenth embodiment. The center response server has a structure formed such that a sending history box 41 is added to the center response server 30 shown in FIG. 1. A mail transfer program has a function for returning a sending history data to meet a request for a sending history. The data structure of the sending history box 41 is shown in FIG. 58. The sending history box 41 is provided for each user and consists of the destination and the body.

Figure 60A:
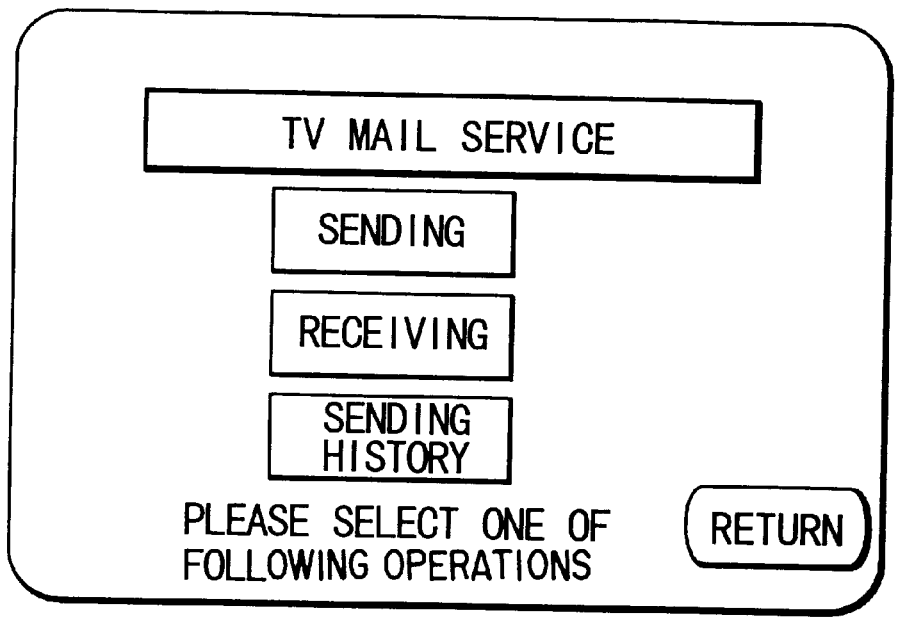
FIGS. 60A and 60B are diagrams showing the structure of a service screen for a sending history which is displayed in the structure according to the tenth embodiment.
Figure 60B:
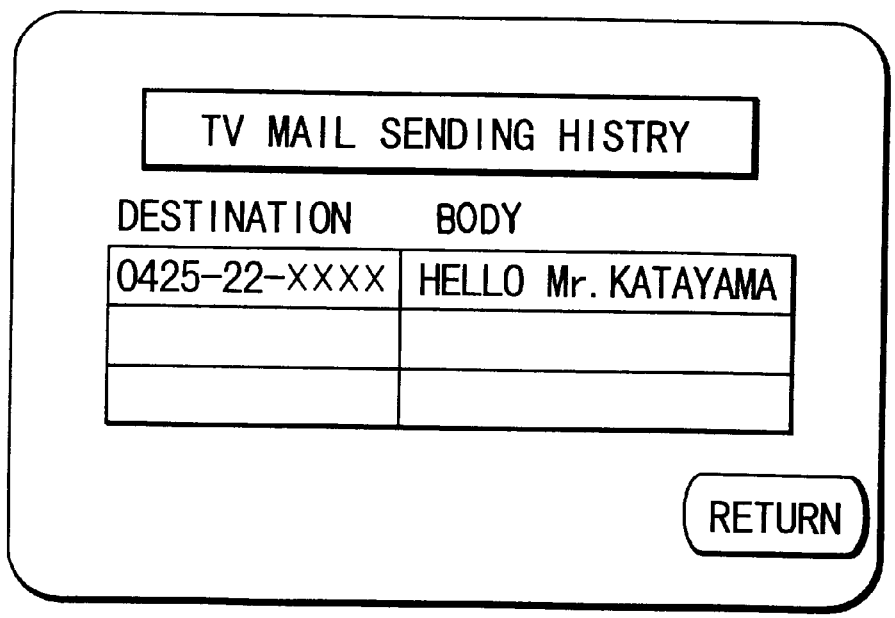

The TV mail service screen and a TV mail sending history screen presented by the interactive television 10 have structures as shown in FIGS. 60A and 60B. The TV mail service screen has a "sending history" button for selecting the sending history. The TV mail sending history list screen displays a list of destinations and bodies sent by the user. The program controller 12 has a function for displaying the sending history list screen shown in FIG. 60B when the sending history button has been depressed on the screen shown in FIG. 60A.

The contents of the sending process, the receiving process and sending history process which are performed by the center response server are shown in FIG. 61. In the center response server, the mail transfer program 32 writes the mail forwarded from the communication controller 34 to a receiver mail box 36, as shown in FIG. 59. In accordance with the contents of the sent mail, history of the original sender with respect to the present sent mail is written to the sending history box 41. Since the sending history box 41 is provided for each user, a sending history box 41, to which the history must be written, is specified in accordance with the sender in mail data. The contents which must be written, are destination and the body.

In the center response server, when a sending history request has been received from the interactive television 10, the mail transfer program 33 specifies the sending history box 41 in accordance with the sender of the sending history request data shown in FIG. 63 to make sending history data from data stored in the sending history box 41 so as to transmit the same to the interactive television. If a plurality of sending histories exist, the sending history data is made for each sending histories. FIG. 64 is a diagram showing the data structure of sending history data. A value indicating the sending history is provided for the header of sending history data.

The interactive television 10 is operated in accordance with a flow chart shown in FIG. 62. When the data receiver 11 has received a history request due to the remote control operation performed by a user, the program controller 12 requests the center response server to supply screen data so as to display TV mail service screen received from the center response server. When the "Sending History" button has been selected on the TV mail service screen, the program controller 12 makes sending history request data shown in FIG. 63 which is forwarded to the center response server.

When the sending history has been forwarded from the center response server to the interactive television 10 which has made the sending history request, the program controller 12 causes the data display section to display the sending history list screen in accordance with sending history data.

As described above, according to this embodiment, the sending history box 41 for each user is provided for the center response server and the sending history data is returned when a sending history request is supplied from the interactive television 10. Therefore, the user is able to confirm the own sending history thereof. Since sending date data is added to the sending history, a further precise history can be obtained.

(Eleventh Embodiment)

A TV mail system according to an eleventh embodiment has a function capable of storing the sending history of the mail sender and another function for indicating whether or not the receiver has received a mail. The TV mail system according to the eleventh embodiment basically has a similar structure as that of the TV mail system shown in FIG. 1.

In this embodiment, a message ID, which is a unique number, is provided for each mail. Therefore, a region for storing the message ID is provided for the sending history box 41 so that data indicating a state of receipt is added. The state of receipt when the receiver has received a mail is brought to Yes. In an affirmative case, the state is brought to No. FIG. 65 is a diagram showing a schematic data structure of the sending history box 41.

Also the receiver mail box 36 is provided with a region for storing the message ID as shown in FIG. 66 so as to store the user ID indicating the sender. Message ID and sender ID are added to also the mail box 37 for the receiver, as shown in FIG. 67.

Referring to a flow chart shown in FIG. 68, an operation of the center response server will now be described such that an operation for writing a state of receipt to the sending history box is mainly described.

When the center response server has received mail data from the interactive television 10, the mail transfer program 33 stores the received mail in the receiver mail box 36. At this time, message ID is provided for the mail so as to be stored together with the user ID of the sender. The message ID must be a unique ID. When the sending history is written in the sending history box 41, the same message ID is used and the state of receipt is made to be No.

When the mail distribution program 39 distributes the mail to the mail box 37 for the receiver, the mail distribution program 39 adds the message ID and the sender ID to the mail to be stored. When receiving request data has been received from the interactive television 10, the mail transfer program 33 makes receiving request data to meet the request from the receiver. At this time, the message ID and the sender ID of the mail are read to specify the sending history box 41 in accordance with the sender ID and specify the sending history in accordance with the message ID, followed by changing the state of receipt of the sending history to Yes.

When the center response server has received a sending history request from the interactive television 10, data indicating the state of receipt is added to sending history data as shown in FIG. 69, followed by transmitting sending history data. Therefore, the interactive television 10 which has received sending history data shown in FIG. 69 is able to display the state of receipt in addition to the sending history, as shown in FIG. 70.

According to this embodiment having the structure such that the function for indicating whether or not the receiver has received a mail is added to the TV mail system having the sending history function, a state of receipt is written to the sending history whenever the receiver receives a mail. Therefore, the sender is able to detect whether or not the receiver has read the mail.

(Twelfth Embodiment)

The twelfth embodiment has a structure such that the contents of a TV mail service provided for a viewer through the interactive television can be updated by broadcasting radio waves from a broadcast station. FIG. 71 is a diagram showing function block of the interactive television 10. A script superimposed on broadcasting radio waves by a broadcast station 60 is separated by the interactive television 10 which has received the broadcasting radio waves so as to store the same in the memory 15. The program controller 12 executes a program described as the script stored in the memory 15 so that a interactive television service and TV mail service are provided.

Figure 72:
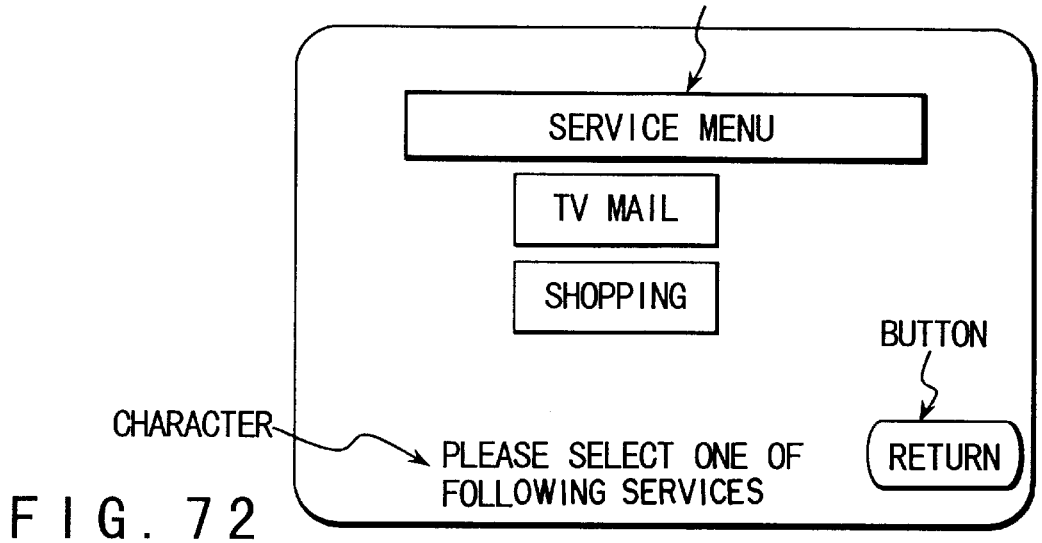
FIG. 72 is diagram showing the structure of a service menu screen on the interactive television.

In order to provide the TV mail service to a viewer, the program controller in the interactive television must control (1) the screen display and (2) the procedure. In a case of a service screen shown in FIG. 72, the screen display function (1) controls characters, graphics, contents indicated by buttons and configuration of buttons and the like on the screen. On the other hand, the procedure function (2) controls composition of data which must be forwarded to the local/center response server in accordance with the contents instructed by the user and analysis of received data. When the program controller 12 performs the TV mail service, the program controller 12 loads up the above-mentioned script from the memory 15 to control the television in accordance with the script.

Figure 73:
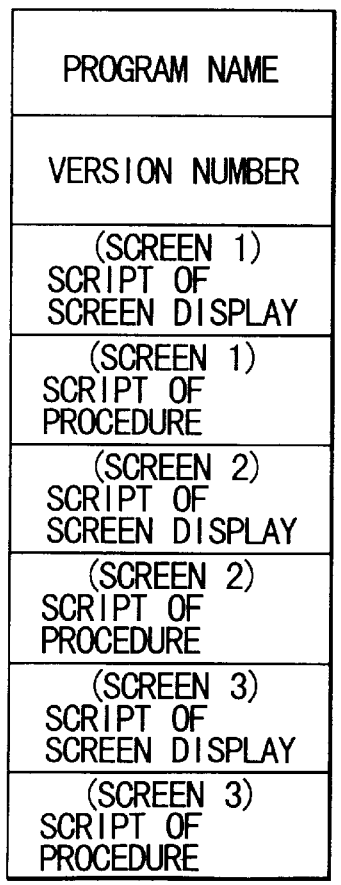
FIG. 73 is a diagram showing the structure of a script according to the twelfth embodiment.
Figure 74:
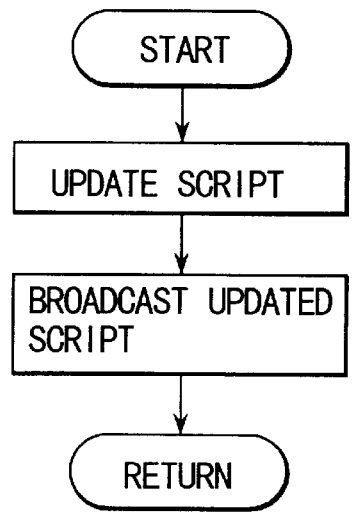
FIG. 74 is a flow chart of an operation in a broadcast station according to the twelfth embodiment.
Figure 75:
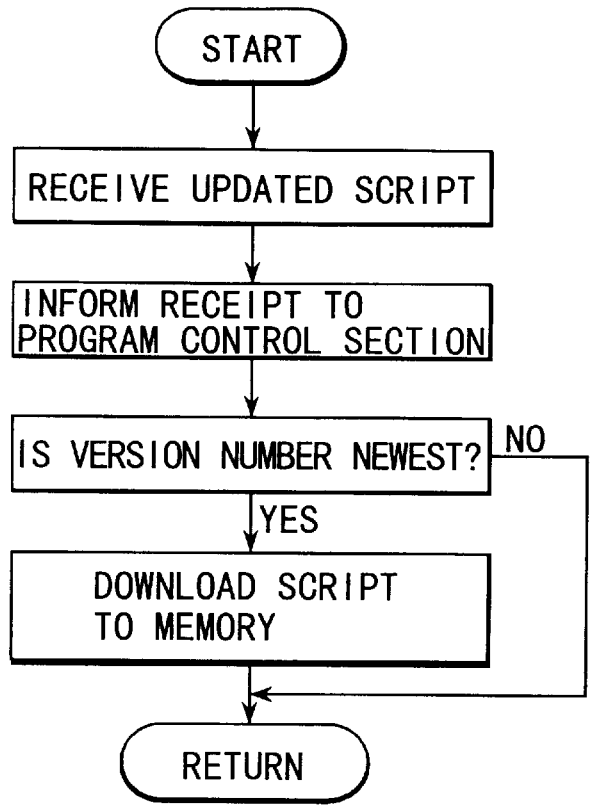
FIG. 75 is a flow chart of an operation in a interactive television according to the twelfth embodiment.

The broadcast station 60 updates the script in accordance with a flow chart shown in FIG. 74. That is, when the contents of the TV mail service have been changed, a script corresponding to the changed contents of the service are made. FIG. 73 is a diagram showing the data structure of the script consisting of program name indicating the contents of the script, version number of the script and a script relating to the script procedure relating to display of each screen. The broadcast station transmits the foregoing script by using a predetermined region of the broadcasting radio waves. Thus, the latest script is forwarded on the broadcasting radio waves transmitted from the broadcast station 60.

When the interactive television 10 has received the broadcasting radio waves having the script, the decoder 16 extracts the script from the received broadcasting radio waves and notifies the receipt to the program controller 12. The program controller 12 subjects the version number of the script stored in the memory 15 and the version number of the received script to a comparison. If the latter version number is new, the program controller 12 writes the received script to the memory 15.

When the program controller 12 performs the TV mail service, the program controller 12 loads up the script from the memory 15 to control the television in accordance with the script.

According to this embodiment having the above-mentioned structure, a latest TV mail service can always be provided with a latest script without a necessity of purchasing a new interactive television.

(Thirteenth Embodiment)

Figure 76:
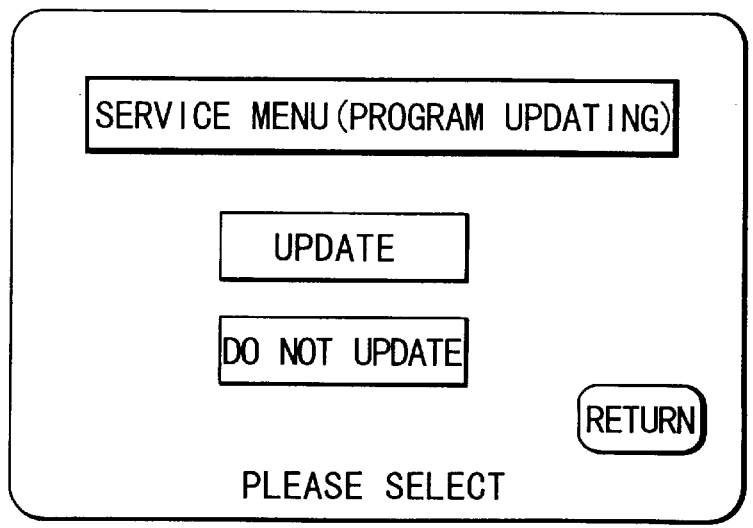
FIG. 76 is a diagram showing the structure of an update acceptance screen of a interactive television according to a thirteenth embodiment of the present invention.

The thirteenth embodiment has a structure such that script is not automatically updated in a state where the user does not know the update but update is performed to meet a request from the user. In this embodiment, a service menu screen as shown in FIG. 76 is displayed to accept a request from a user whether or not the user requires the update. The service menu screen is structured such that either "Update" or "Not Update" can be selected by the remote control operation performed by the user.

Figure 77:
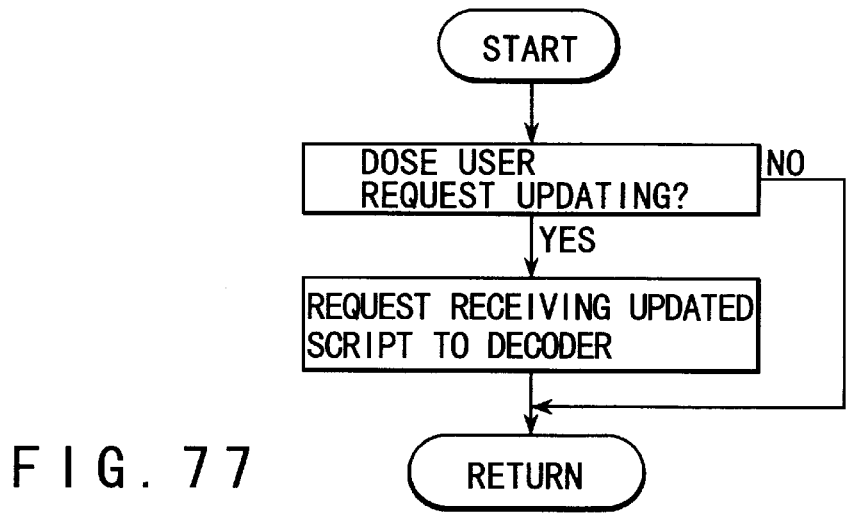
FIG. 77 is a flow chart of acceptance of update in a interactive television according to a thirteenth embodiment of the present invention.
Figure 78:
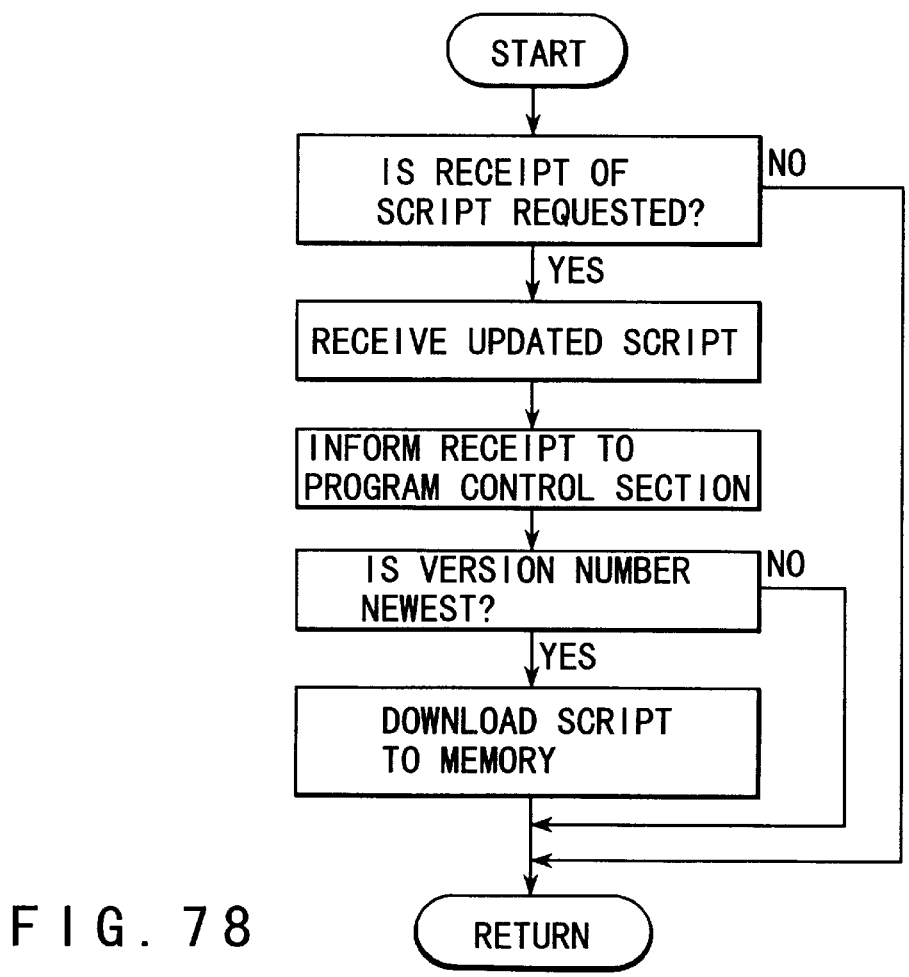
FIG. 78 is a flow chart of an operation for updating a script for the interactive television according to the thirteenth embodiment.

FIGS. 77 and 78 are flow charts showing the operation of the interactive television. Referring to the flow charts, the operation of this embodiment will now be described. The broadcast station 60 has a structure similar to that according to the twelfth embodiment and thus arranged to forward the latest script on the broadcasting radio waves.

As shown in FIG. 77, when the program controller 12 of the interactive television 10 has recognized that the "Update" button has been depressed on the service menu screen shown in FIG. 76, the program controller 12 requests the decoder 19 to receive the updated script.

When the decoder 19 of the interactive television 10 has extracted the updated script from the broadcasting radio waves in a state where update of the script has been requested, the decoder 19 notifies the program controller 12 the extraction together with the version number of the received script. The program controller 12 compares the version numbers. If the version number of the received script is new, the program controller 12 loads down the received script to the memory 15.

According to this embodiment having the above-mentioned structure, the script can be updated in accordance with the intention of the user. Thus, update of the script which is not required by the user can be prevented. The present invention is not limited to the above-mentioned embodiment. A TV mail system can arbitrarily be formed by combining the structures of the above-mentioned embodiments.

We claim:

1. A TV mail system comprising:

a plurality of televisions each having a receiving function capable of receiving broadcasting radio waves and displaying a program; and a mail server to which said televisions are connected through communication lines, wherein each television includes a mail sending portion functioning to compose mail data to be sent to a destination including at least destination information and a body portion and a mail receiving portion functioning to receive mail data from said mail server and to display the received mail data, said mail sending portion further functioning to output the mail data to said mail server and including reply mail making means for preparing reply mail to reply to the received mail from a sender when the received mail is displayed and a request for reply mail is made, said reply mail making means automatically including a telephone number of the sender as said destination information for the reply mail, the mail server having a database in which authentification information of users is registered, a receiving mailbox for storing received mail data, mailboxes for receivers, a mail distribution means for distributing, to a mailbox for each receiver, mail data stored in said authentification database and an outputting means which sends out the mail data received from one television to at least one different television in correspondence with the destination information.

2. A TV mail system comprising:

a plurality of televisions each having a receiving function capable of receiving broadcasting radio waves and displaying a program; and a mail server to which said televisions are connected through communication lines, wherein said television has a mail sending function for displaying a mail sending screen and accepting destination telephone number and a mail body to make mail data so as to output the mail data to said mail server, and a mail receiving function for receiving mail data transmitted from said mail server to meet a mail receiving request to display a mail receipt screen on the basis of the contents of mail data, and said mail server has a database in which authentication information including user identifier of users of said televisions are registered, a receiving mail box for storing received mail data, mail boxes for receivers, name analysis means which retrieves said authentication database in accordance with destination telephone number of mail data stored in said receiving mail box to acquire information for specifying said mail box of a destined receiver, mail distribution means for storing mail data stored in said receiving mail box in said mail box in accordance with information for specifying said mail box, and transfer means which takes out mail information from the corresponding mail box to meet a mail receiving request from said television to make mail data so as to output the mail data to said televisions of the receiver who has made the mail receiving request.

3. A TV mail system according to claim 1, wherein said authentication database has a region in which receiving information is written and receiving information is brought to an receiving state when mail data has been received and is brought to a non-receiving state when the mail receiving request has been made.

4. A TV mail system according to claim 2, wherein said authentication database has a region in which receiving information is written and receiving information is brought to an receiving state when mail data has been received and is brought to a non-receiving state when the mail receiving request has been made.

5. A TV mail system according to claim 2, wherein said television has reply mail making means which accepts a reply mail to the received mail when a received mail is displayed and which makes mail data for a reply mail in which telephone number of the sender provided for the received mail is automatically set as destined telephone number when a request to make the reply mail has been made.

6. A TV mail system according to claim 4, wherein said television has reply mail making means which accepts a reply mail to the received mail when a received mail is displayed and which makes mail data for a reply mail in which telephone number of the sender provided for the received mail is automatically set as destined telephone number when a request to make the reply mail has been made.

7. A TV mail system according to claim 1, wherein said mail sending portion includes forward mail making means which accepts a forward request of a received mail when the received mail is displayed and which makes mail data for transference in which the address of the sender provided for the received mail is automatically set as the address of an original sender when a request to forward the received mail has been made.

8. A TV mail system according to claim 2, wherein
said television has forward mail making means which accepts a forward request of a received mail when the received mail is displayed and which makes mail data for transference in which the address of the sender provided for the received mail is automatically set as the address of an original sender when a request to forward the received mail has been made.

9. A TV mail system according to claim 3, wherein
said television has forward mail making means which accepts a forward request of a received mail when the received mail is displayed and which makes mail data for transference in which the address of the sender provided for the received mail is automatically set as the address of an original sender when a request to forward the received mail has been made.

10. A TV mail system according to claim 4, wherein
said television has forward mail making means which accepts a forward request of a received mail when the received mail is displayed and which makes mail data for transference in which the address of the sender provided for the received mail is automatically set as the address of an original sender when a request to forward the received mail has been made.

11. A TV mail system according to claim 5, wherein
said television has forward mail making means which accepts a forward request of a received mail when the received mail is displayed and which makes mail data for transference in which the address of the sender provided for the received mail is automatically set as the address of an original sender when a request to forward the received mail has been made.

12. A TV mail system according to claim 6, wherein
said television has forward mail making means which accepts a forward request of a received mail when the received mail is displayed and which makes mail data for transference in which the address of the sender provided for the received mail is automatically set as the address of an original sender when a request to forward the received mail has been made.

13. A TV mail system according to claim 1, wherein
said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and
said television has means which accepts sending history request on the mail service screen to output the sending history request data to the server provided with said sending history box and means for displaying a list of sending history of the user on the basis of sending history data transmitted from said server to correspond to said sending history request.

14. A TV mail system according to claim 2, wherein
said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and
said television has means which accepts sending history request on the mail service screen to output the sending history request data to the server provided with said sending history box and means for displaying a list of sending history of the user on the basis of sending history data transmitted from said server to correspond to said sending history request.

15. A TV mail system according to claim 3, wherein
said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and
said television has means which accepts sending history request on the mail service screen to output the sending history request data to the server provided with said sending history box and means for displaying a list of sending history of the user on the basis of sending history data transmitted from said server to correspond to said sending history request.

16. A TV mail system according to claim 4, wherein
said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and
said television has means which accepts sending history request on the mail service screen to output the sending history request data to the server provided with said sending history box and means for displaying a list of sending history of the user on the basis of sending history data transmitted from said server to correspond to said sending history request.

17. A TV mail system according to claim 5, wherein
said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and
said television has means which accepts sending history request on the mail service screen to output the sending history request data to the server provided with said sending history box and means for displaying a list of sending history of the user on the basis of sending history data transmitted from said server to correspond to said sending history request.

18. A TV mail system according to claim 6, wherein said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and said television has means which accepts sending history request on the mail service screen to output the sending history request data to the server provided with said sending history box and means for displaying a list of sending history of the user on the basis of sending history data transmitted from said server to correspond to said sending history request.

19. A TV mail system according to claim 7, wherein said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and said television has means which accepts sending history request on the mail service screen to output the sending history request data to the server provided with said sending history box and means for displaying a list of sending history of the user on the basis of sending history data transmitted from said server to correspond to said sending history request.

20. A TV mail system according to claim 8, wherein said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and said television has means which accepts sending history request on the mail service screen to output the sending history request data to the server provided with said sending history box and means for displaying a list of sending history of the user on the basis of sending history data transmitted from said server to correspond to said sending history request.

21. A TV mail system according to claim 9, wherein said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and said television has means which accepts sending history request on the mail service screen to output the sending history request data to the server provided with said sending history box and means for displaying a list of sending history of the user on the basis of sending history data transmitted from said server to correspond to said sending history request.

22. A TV mail system according to claim 10, wherein said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and said television has means which accepts sending history request on the mail service screen to output the sending history request data to the server provided with said sending history box and means for displaying a list of sending history of the user on the basis of sending history data transmitted from said server to correspond to said sending history request.

23. A TV mail system according to claim 11, wherein said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and said television has means which accepts sending history request on the mail service screen to output the sending history request data to the server provided with said sending history box and means for displaying a list of sending history of the user on the basis of sending history data transmitted from said server to correspond to said sending history request.

24. A TV mail system according to claim 12, wherein said mail server has a sending history box prepared for each user, means for storing mail data in said receiving mail box when said server has received mail data and storing mail data in a sending history box for the user and means which takes out the sending history from said sending history box for the user when a sending history request has been received to make sending history data so as to output the sending history data to said television from which the request has been made, and said television has means which accepts sending history request on the mail service screen to output the sending history request data to the server provided with said sending history box and means for displaying a list of sending history of the user on the basis of sending history data transmitted from said server to correspond to said sending history request.

25. A TV mail system according to any one of claims 1 or 2, wherein said television has classification selection means for causing a classification list of typical bodies to cause a user to select a classification of the typical bodies from the classification list, typical body selection means for causing a list of the typical bodies belonging to the classification of the typical bodies selected by said classification selection means to cause the user to select a typical body and input support means for supporting writing of a mail by inserting one or a plurality of the typical bodies selected by said typical body selection means into a mail body which is being written.

26. A TV mail system according to any one of claims 1 or 2, wherein
said television has printing means for reading contents of screen data which is being displayed on the screen and printing screen data and means for requesting said printing means to print the contents by recognizing a print command issued from a user.

27. A TV mail system according to claim 25, wherein
said television has printing means for reading contents of screen data which is being displayed on the screen and printing screen data and means for requesting said printing means to print the contents by recognizing a print command issued from a user.

28. A TV mail system according to claim 26, wherein
said television has means for adding, to mail data, a print permission flag indicating whether or not the mail can be printed and means for checking the print permission flag added to mail data received by said television to determine whether or not printing is permitted.

29. A TV mail system according to claim 27, wherein
said television has means for adding, to mail data, a print permission flag indicating whether or not the mail can be printed and means for checking the print permission flag added to mail data received by said television to determine whether or not printing is permitted.

30. A TV mail system according to any one of claims 1 or 2, wherein
said mail server has a screen database for storing screen data relating to a mail service which is displayed by said television so that required screen data taken out from said screen database is forwarded to said television which has made a request.

31. A TV mail system according to claim 25, wherein
said mail server has a screen database for storing screen data relating to a mail service which is displayed by said television so that required screen data taken out from said screen database is forwarded to said television which has made a request.

32. A TV mail system according to claim 26, wherein
said mail server has a screen database for storing screen data relating to a mail service which is displayed by said television so that required screen data taken out from said screen database is forwarded to said television which has made a request.

33. A TV mail system according to claim 27, wherein
said mail server has a screen database for storing screen data relating to a mail service which is displayed by said television so that required screen data taken out from said screen database is forwarded to said television which has made a request.

34. A TV mail system according to claim 28, wherein
said mail server has a screen database for storing screen data relating to a mail service which is displayed by said television so that required screen data taken out from said screen database is forwarded to said television which has made a request.

35. A TV mail system according to claim 29, wherein
said mail server has a screen database for storing screen data relating to a mail service which is displayed by said television so that required screen data taken out from said screen database is forwarded to said television which has made a request.

36. A TV mail system according to any one of claims 1 or 2, wherein
said television has means for extracting, from received broadcasting radio waves transmitted from a broadcast station, a script in which procedures for mail transmission and receipt, a variety of required screen data items corresponding to the contents of the mail service and control contents of screen display are described and a memory for storing the script extracted by said extracting means.

37. A TV mail system according to claim 25, wherein
said television has means for extracting, from received broadcasting radio waves transmitted from a broadcast station, a script in which procedures for mail transmission and receipt, a variety of required screen data items corresponding to the contents of the mail service and control contents of screen display are described and a memory for storing the script extracted by said extracting means.

38. A TV mail system according to claim 26, wherein
said television has means for extracting, from received broadcasting radio waves transmitted from a broadcast station, a script in which procedures for mail transmission and receipt, a variety of required screen data items corresponding to the contents of the mail service and control contents of screen display are described and a memory for storing the script extracted by said extracting means.

39. A TV mail system according to claim 27, wherein
said television has means for extracting, from received broadcasting radio waves transmitted from a broadcast station, a script in which procedures for mail transmission and receipt, a variety of required screen data items corresponding to the contents of the mail service and control contents of screen display are described and a memory for storing the script extracted by said extracting means.

40. A TV mail system according to claim 28, wherein
said television has means for extracting, from received broadcasting radio waves transmitted from a broadcast station, a script in which procedures for mail transmission and receipt, a variety of required screen data items corresponding to the contents of the mail service and control contents of screen display are described and a memory for storing the script extracted by said extracting means.

41. A TV mail system according to claim 29, wherein
said television has means for extracting, from received broadcasting radio waves transmitted from a broadcast station, a script in which procedures for mail transmission and receipt, a variety of required screen data items corresponding to the contents of the mail service and control contents of screen display are described and a memory for storing the script extracted by said extracting means.

42. A TV mail system according to claim 36, wherein
said television has means for accepting a script update request supplied from a user and script update means for storing a corresponding script in said memory to update the script when the script has been extracted from the received broadcasting radio waves in a state where the script update request supplied to said acceptance means is effective.

43. A TV mail system according to claim 37, wherein said television has means for accepting a script update request supplied from a user and script update means for storing a corresponding script in said memory to update the script when the script has been extracted from the received broadcasting radio waves in a state where the script update request supplied to said acceptance means is effective.

44. A TV mail system according to claim 38, wherein said television has means for accepting a script update request supplied from a user and script update means for storing a corresponding script in said memory to update the script when the script has been extracted from the received broadcasting radio waves in a state where the script update request supplied to said acceptance means is effective.

45. A TV mail system according to claim 40, wherein said television has means for accepting a script update request supplied from a user and script update means for storing a corresponding script in said memory to update the script when the script has been extracted from the received broadcasting radio waves in a state where the script update request supplied to said acceptance means is effective.

46. A TV mail system according to claim 40, wherein said television has means for accepting a script update request supplied from a user and script update means for storing a corresponding script in said memory to update the script when the script has been extracted from the received broadcasting radio waves in a state where the script update request supplied to said acceptance means is effective.

47. A TV mail system according to claim 41, wherein said television has means for accepting a script update request supplied from a user and script update means for storing a corresponding script in said memory to update the script when the script has been extracted from the received broadcasting radio waves in a state where the script update request supplied to said acceptance means is effective.

48. A TV mail system comprising:

a plurality of televisions each having a receiving function capable of receiving broadcasting radio waves and displaying a program; and a mail server to which said televisions are connected through communication lines, wherein each television includes a mail sending portion functioning to compose mail data to be sent to a destination including at least destination information and a body portion and a mail receiving portion functioning to receive mail data from said mail server and to display the received mail data, said mail sending portion further functioning to output the mail data to said mail server and to automatically include at least a telephone number of a sender of received mail data as the destination information of mail data to be composed when a user commands composing of reply mail data relative to any of said received mail data as said mail data, said mail server further has a database in which authentification information of users is registered, a receiving mailbox for storing received mail data, mailboxes for receivers, a mail distribution means for distributing, to a mailbox for each receiver, mail data stored in said authentification database and an outputting means which sends out the mail data received from one television to at least one different television in correspondence with the destination information.

* * * * *